Figure 1:
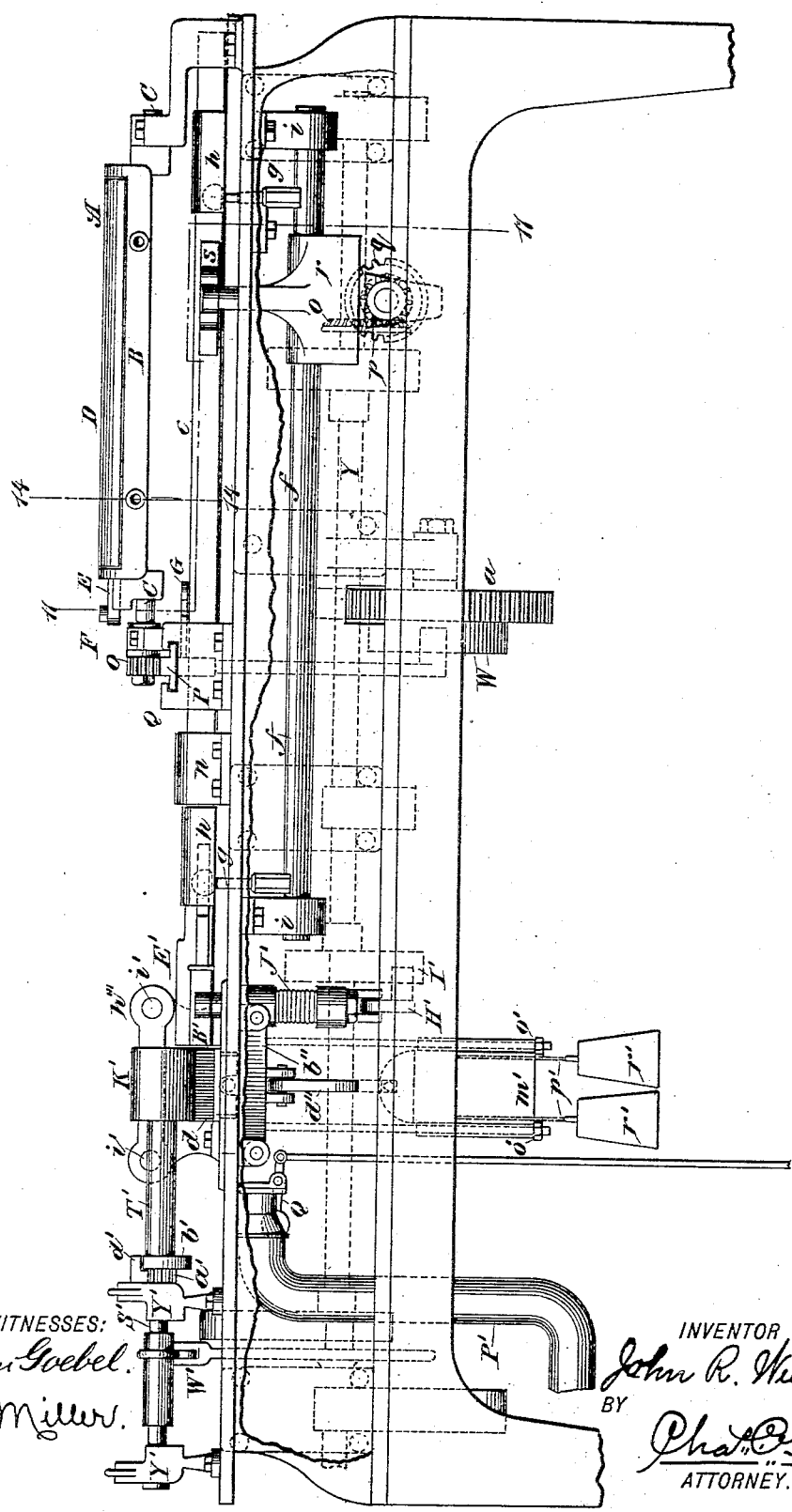

(No Model.)　　　　　　　　　　　　　　　　　16 Sheets—Sheet 1.
J. R. WILLIAMS.
CIGARETTE MAKING MACHINE.

No. 504,768.　　　　　　　　　Patented Sept. 12, 1893.

WITNESSES:　　　　　　　　　　　　　　　　　INVENTOR
William Goebel.　　　　　　　　　　　　　John R. Williams
Ed. D. Miller.　　　　　　　　　　　　　BY
　　　　　　　　　　　　　　　　　　　　Chas. O. Gill
　　　　　　　　　　　　　　　　　　　　ATTORNEY.

(No Model.)
16 Sheets—Sheet 3.

J. R. WILLIAMS.
CIGARETTE MAKING MACHINE.

No. 504,768.
Patented Sept. 12, 1893.

WITNESSES:
William Goebel.
Ed. D. Miller.

INVENTOR
John R. Williams,
BY Chas. O. Gill
ATTORNEY.

(No Model.) 16 Sheets—Sheet 5.

J. R. WILLIAMS.
CIGARETTE MAKING MACHINE.

No. 504,768. Patented Sept. 12, 1893.

WITNESSES:
William Goebel
Ed. D. Miller

INVENTOR
John R. Williams,
BY
Chas. A. Gill
ATTORNEY.

(No Model.)  
16 Sheets—Sheet 8.

J. R. WILLIAMS.
CIGARETTE MAKING MACHINE.

No. 504,768.  
Patented Sept. 12, 1893.

WITNESSES:  
William Goebel.  
Ed. D. Miller.

INVENTOR  
John R. Williams,  
BY  
Chas. O. Gill  
ATTORNEY.

(No Model.) 16 Sheets—Sheet 9.

J. R. WILLIAMS.
CIGARETTE MAKING MACHINE.

No. 504,768. Patented Sept. 12, 1893.

WITNESSES:
William Goebel.
Ed. D. Miller.

INVENTOR
John R. Williams,
BY Chas. B. Gill
ATTORNEY.

(No Model.) 16 Sheets—Sheet 10.
J. R. WILLIAMS.
CIGARETTE MAKING MACHINE.
No. 504,768. Patented Sept. 12, 1893.
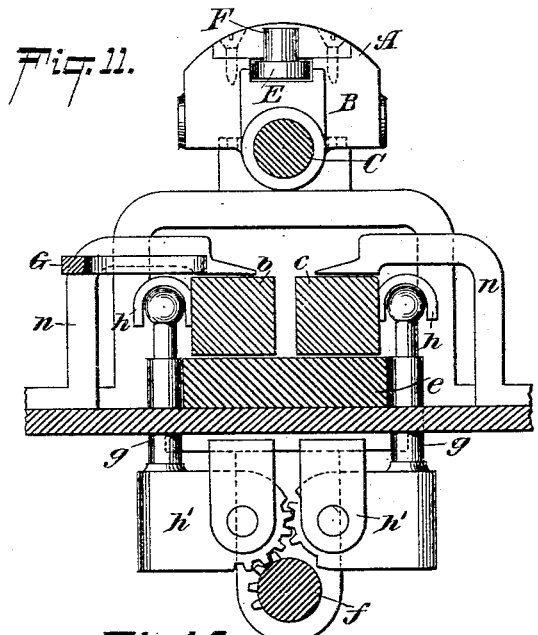
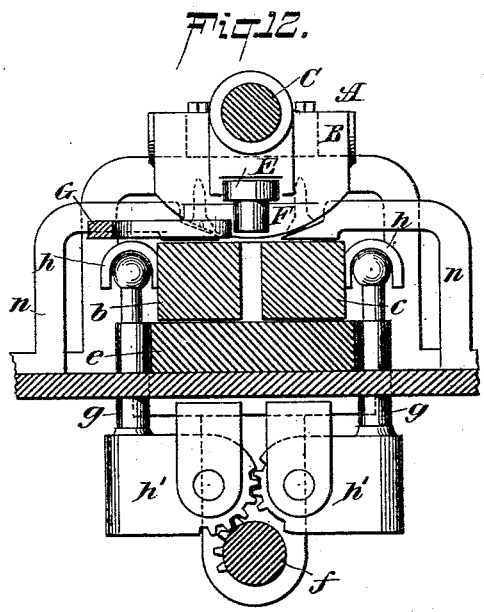
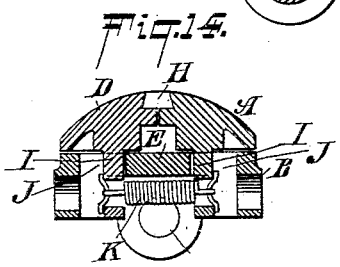
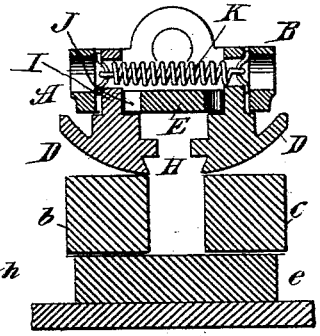
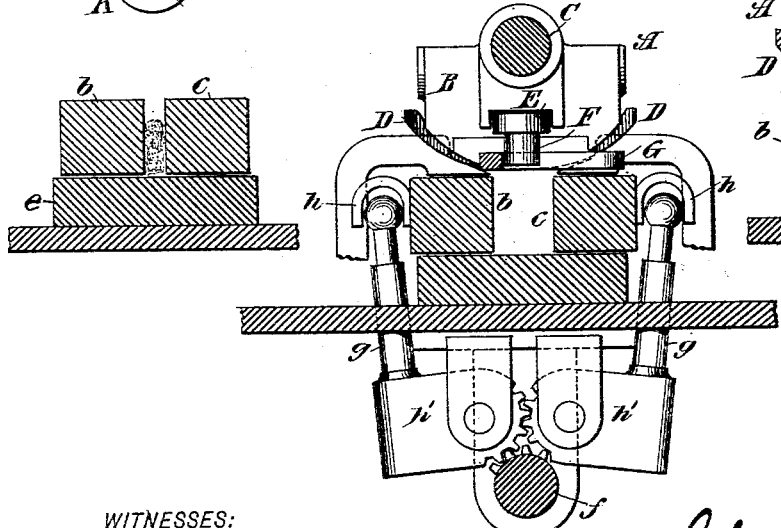
WITNESSES:
William Goebel.
Ed. D. Miller.
INVENTOR
John R. Williams
BY
Chas. O. Gill
ATTORNEY.

(No Model.) 16 Sheets—Sheet 11.
J. R. WILLIAMS.
CIGARETTE MAKING MACHINE.
No. 504,768. Patented Sept. 12, 1893.
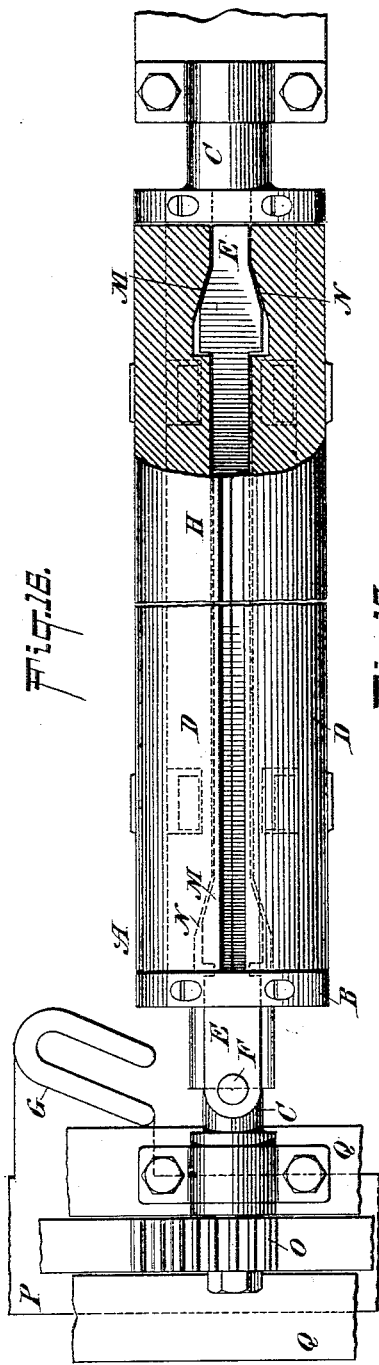
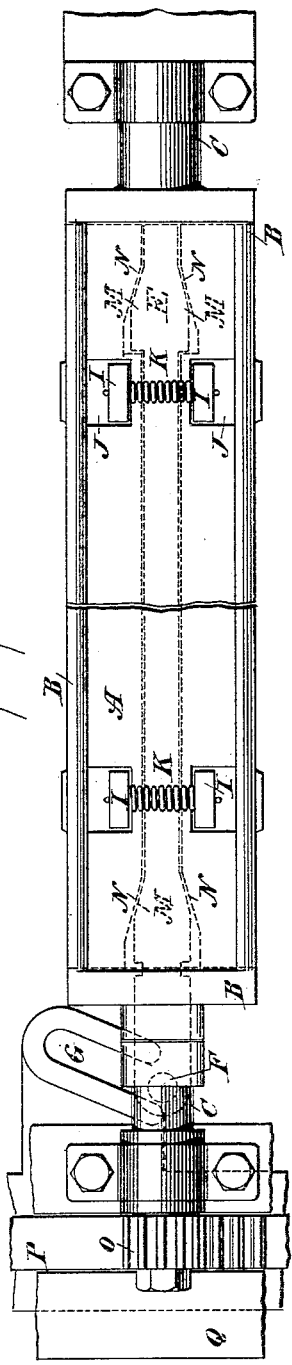
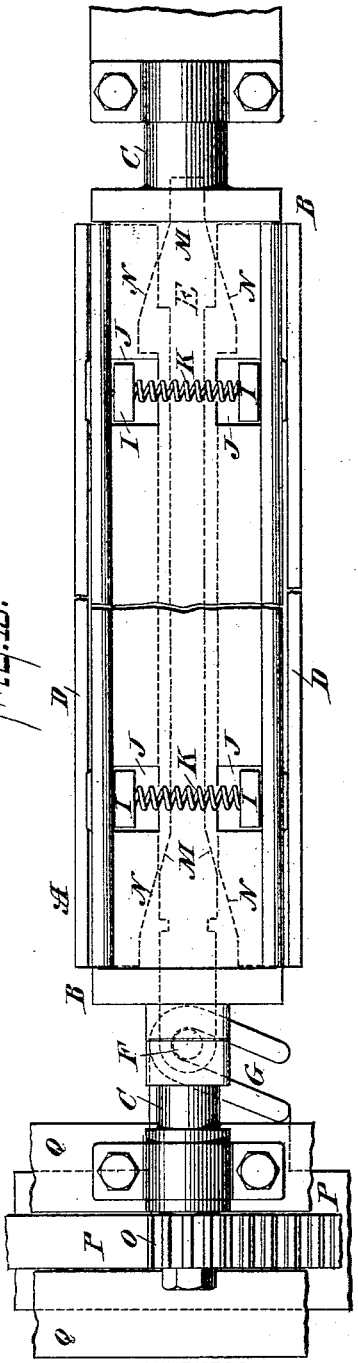
WITNESSES:
William Goebel.
Ed. D. Miller.
INVENTOR
John R. Williams,
BY
Chas. C. Gill
ATTORNEY.

(No Model.) 16 Sheets—Sheet 12.

J. R. WILLIAMS.
CIGARETTE MAKING MACHINE.

No. 504,768. Patented Sept. 12, 1893.

WITNESSES:
William Goebel
Ed. D. Miller

INVENTOR
John R. Williams,
BY
Chas. B. Gill
ATTORNEY.

(No Model.)  
16 Sheets—Sheet 13.

J. R. WILLIAMS.
CIGARETTE MAKING MACHINE.

No. 504,768.  
Patented Sept. 12, 1893.

WITNESSES:  
William Goebel.  
Ed. D. Miller.

INVENTOR  
John R. Williams,  
BY Chas. O. Gill  
ATTORNEY.

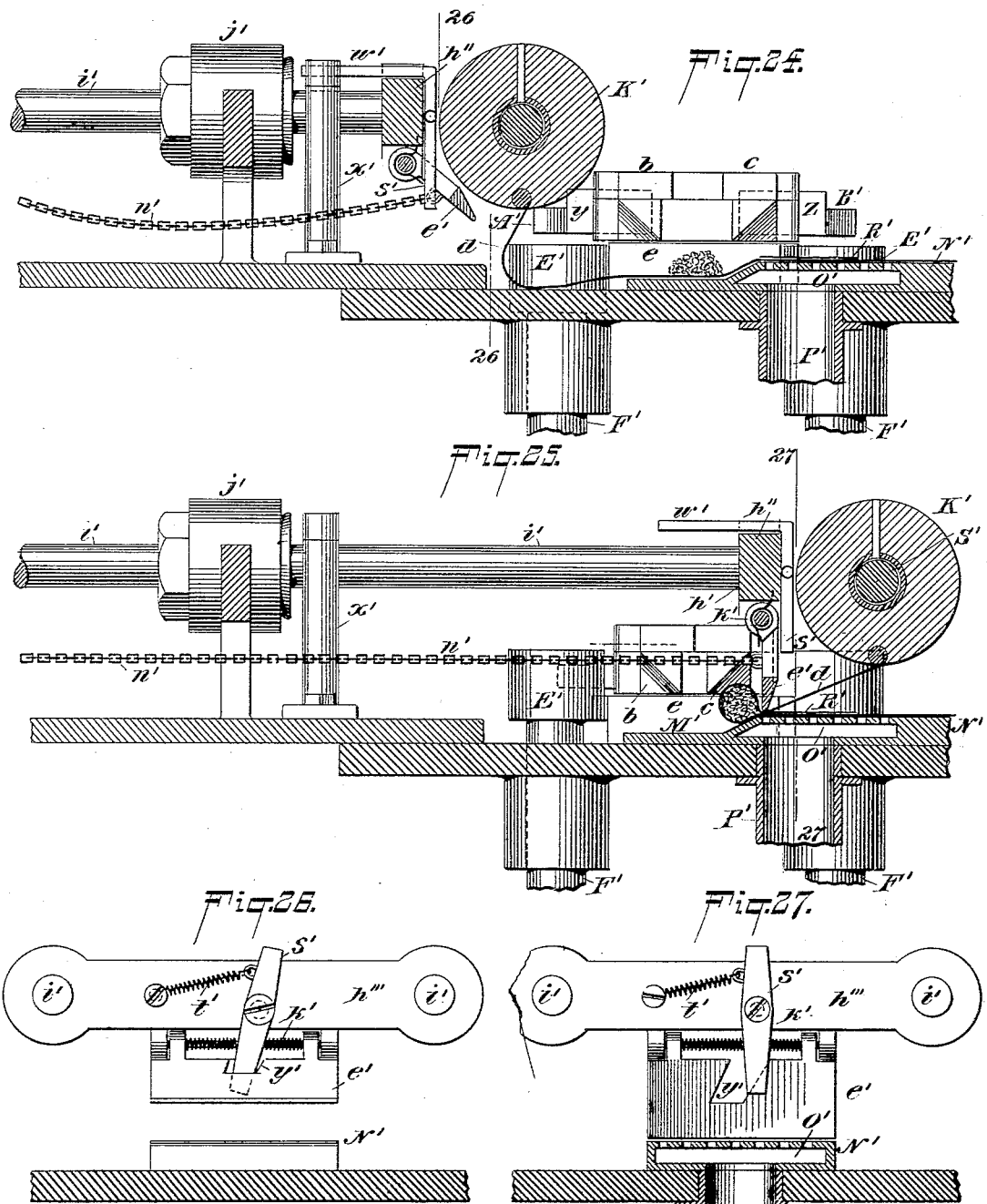

(No Model.)  16 Sheets—Sheet 15.
J. R. WILLIAMS.
CIGARETTE MAKING MACHINE.
No. 504,768.  Patented Sept. 12, 1893.
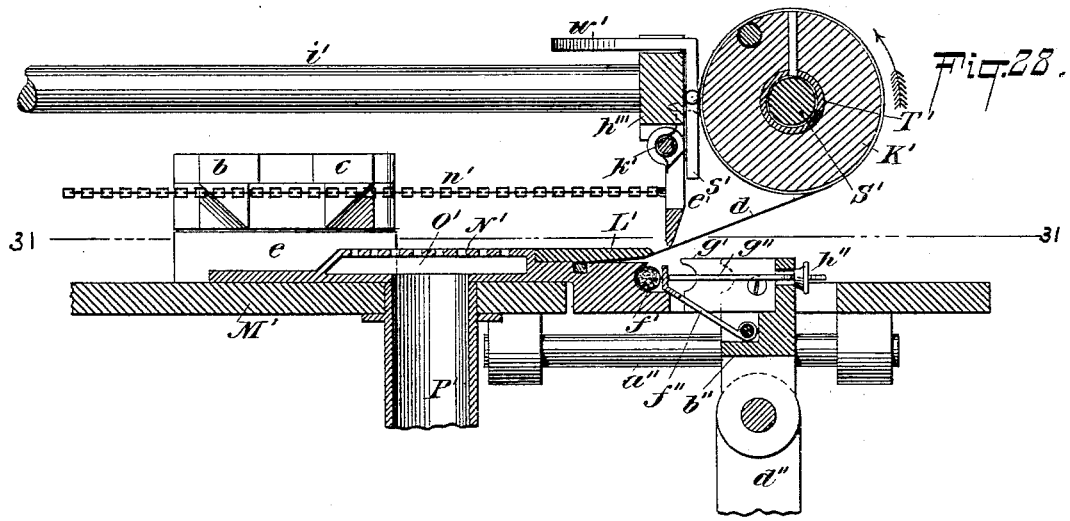
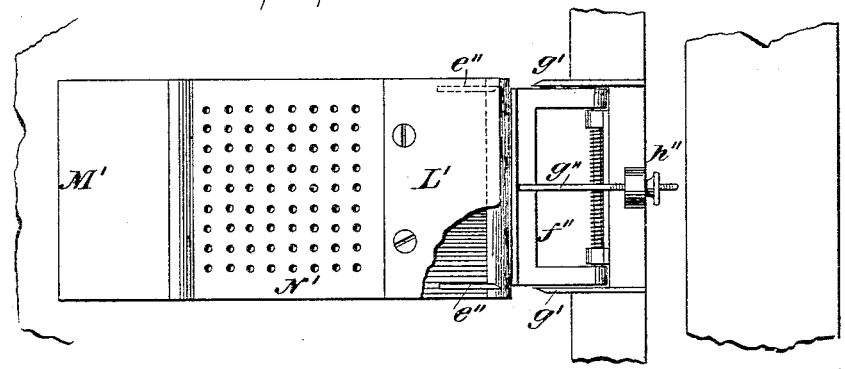
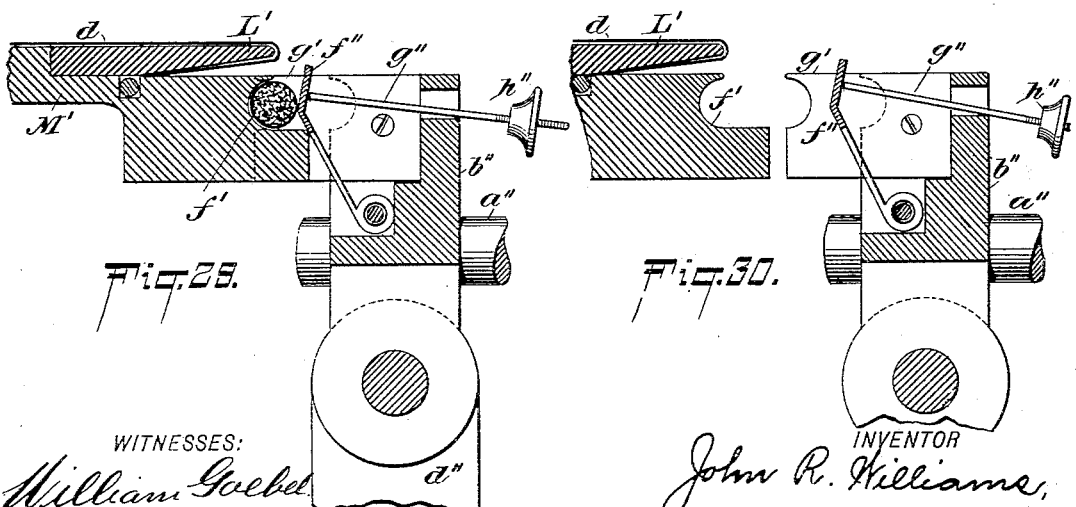
WITNESSES:
William Goebel
Ed. D. Miller.
INVENTOR
John R. Williams,
BY
Chas. C. Gill
ATTORNEY.

(No Model.) 16 Sheets—Sheet 16.

J. R. WILLIAMS.
CIGARETTE MAKING MACHINE.

No. 504,768. Patented Sept. 12, 1893.

WITNESSES:
William Goebel
Ed. D. Miller

INVENTOR
John R. Williams,
BY
Chas. C. Gill
ATTORNEY.

UNITED STATES PATENT OFFICE.

JOHN R. WILLIAMS, OF NEW YORK, N. Y.

CIGARETTE-MAKING MACHINE.

SPECIFICATION forming part of Letters Patent No. 504,768, dated September 12, 1893.

Application filed December 27, 1892. Serial No. 456,499. (No model.)

*To all whom it may concern:*

Be it known that I, JOHN R. WILLIAMS, a citizen of the United States, and a resident of New York, in the county of New York and State of New York, have invented certain new and useful Improvements in Cigarette-Making Machines, of which the following is a specification.

The invention relates to improvements in cigarette making machines, and consists in the novel features and combinations of parts, with certain details of construction, hereinafter fully described and particularly pointed out in the claims.

The machine embodying my invention and hereinafter described, embraces a receiver having an elongated groove in which the filler tobacco is placed, a pair of elongated reciprocating feeding jaws which receive between themselves the elongated body of filler tobacco from the said receiver and deliver severed charges of same to the rolling apron, and rolling mechanism consisting of the said apron and a compressor blade whose edge while under pressure binds upon the loop of the apron in which the tobacco is being rolled and insures the formation of compact evenly rolled cigarettes.

The invention further consists in means for applying the requisite pressure to said compressor blade, and further means for receiving and trimming the ends of the cigarettes as they are one after another discharged from the rolling apron.

The said invention also embraces a perforated rolling apron and a perforated table or bed upon which the apron is located and which is connected by a pipe with a suction blower or other air suction apparatus, the perforated portion of the apron being to receive the binder or wrapper and the air suction to maintain the latter in a uniform even condition before and during the operation of rolling the filler tobacco or bunch.

The invention further consists in means connected with the apron whereby during the latter part of the operation of rolling the cigarette the apron will be wound upon a roller and during the first part of the receding movement of said apron to its initial position it will be unwound from said roller, the purpose of this feature of the mechanism being to enable the employment of a comparatively long apron on a short table. The receiver above referred to is elongated in order that it may contain in its groove enough tobacco to form a body of filler tobacco sufficient in length for five cigarettes, and this body is deposited between the longitudinal feeding jaws above mentioned, which open and close laterally and have a longitudinal reciprocating movement; these jaws rest upon a stationary bed which when the jaws are separated supports the body of filler tobacco. These jaws are open or separated when they first receive the filler tobacco and they then close against the same and move sufficiently to have their discharge end pass across the rolling apron, when they open and drop a severed length of said tobacco on said apron in position to be rolled in the binder or wrapper. After the jaws open and drop the charge of tobacco on the apron, they move back to their former position while remaining open so as not to push the filler tobacco back or materially disturb the same, and thereupon the jaws again close in contact with the filler tobacco and travel with the same across the rolling apron, when they again open and drop a further severed charge of the tobacco thereon. This short reciprocating movement of the feeding jaws when closed across the apron and back again while open continues constantly during the operation of the machine, a further elongated body of the filler tobacco being deposited between them as soon as the preceding body thereof is in the severed charges fed to the apron.

The construction and operation of the various parts of the machine will be specifically described in their order hereinafter, from which description and the accompanying drawings the invention will be more fully understood.

The machine which is the subject hereof is illustrated in the operation of rolling all tobacco cigarettes, but I do not confine the invention to the use of a tobacco wrapper or binder, nor to the manufacture of cigarettes of any special length or diameter; nor is the invention confined to rolling what are technically known as cigarettes, since the filler and wrapper or binder may be of larger proportions than that required for the usual cigarette and under such conditions the product would ordinarily be termed cigars or bear other trade designation.

In the drawings are shown various cams and connecting arms for imparting movement from the main driving shaft to the mechanism constituting the essential parts of the machine, but the invention is not confined to these special cams and arms and they may be varied within the skill of the intelligent mechanic.

Figure 2:
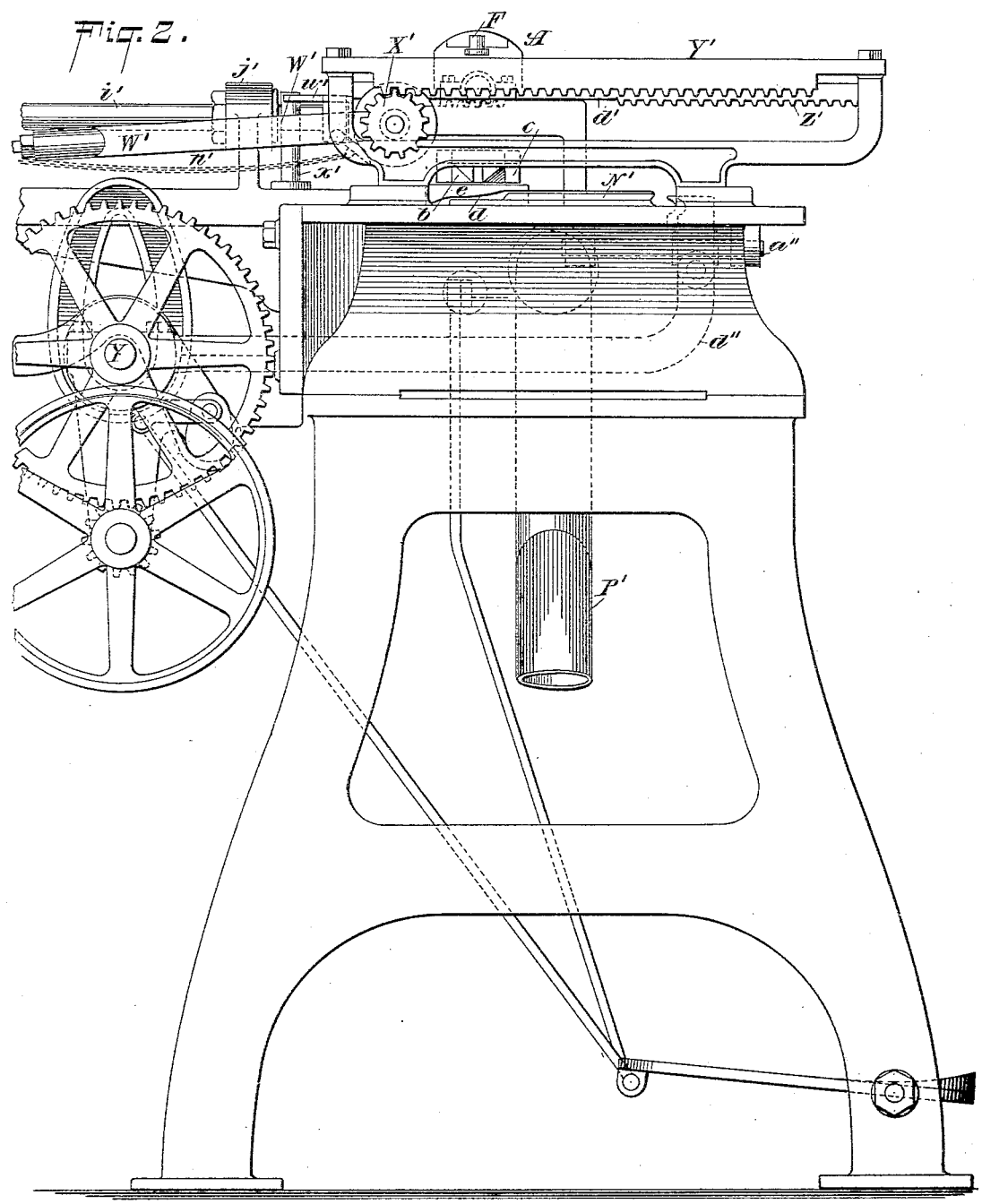
Figure 3:
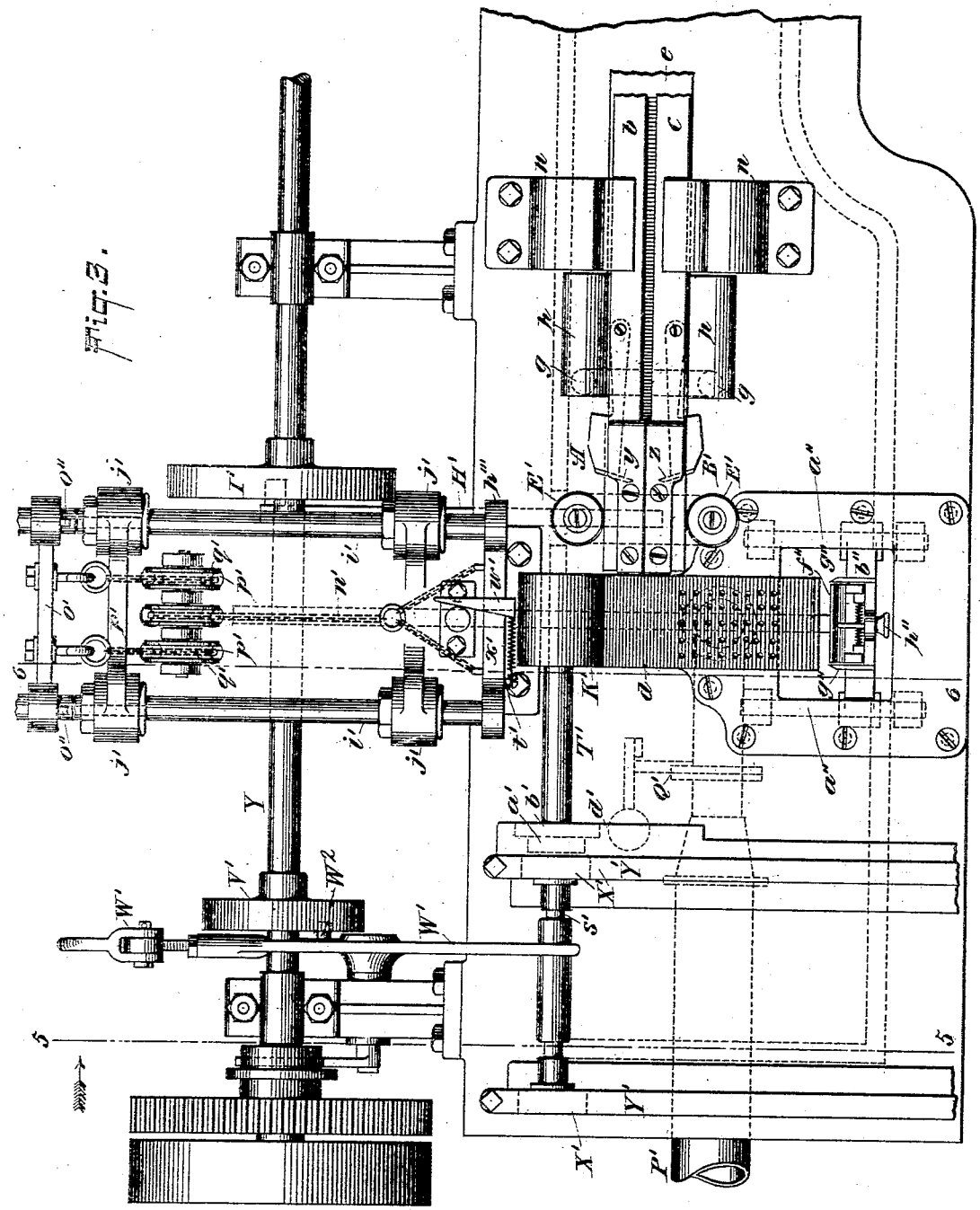
Figure 4:
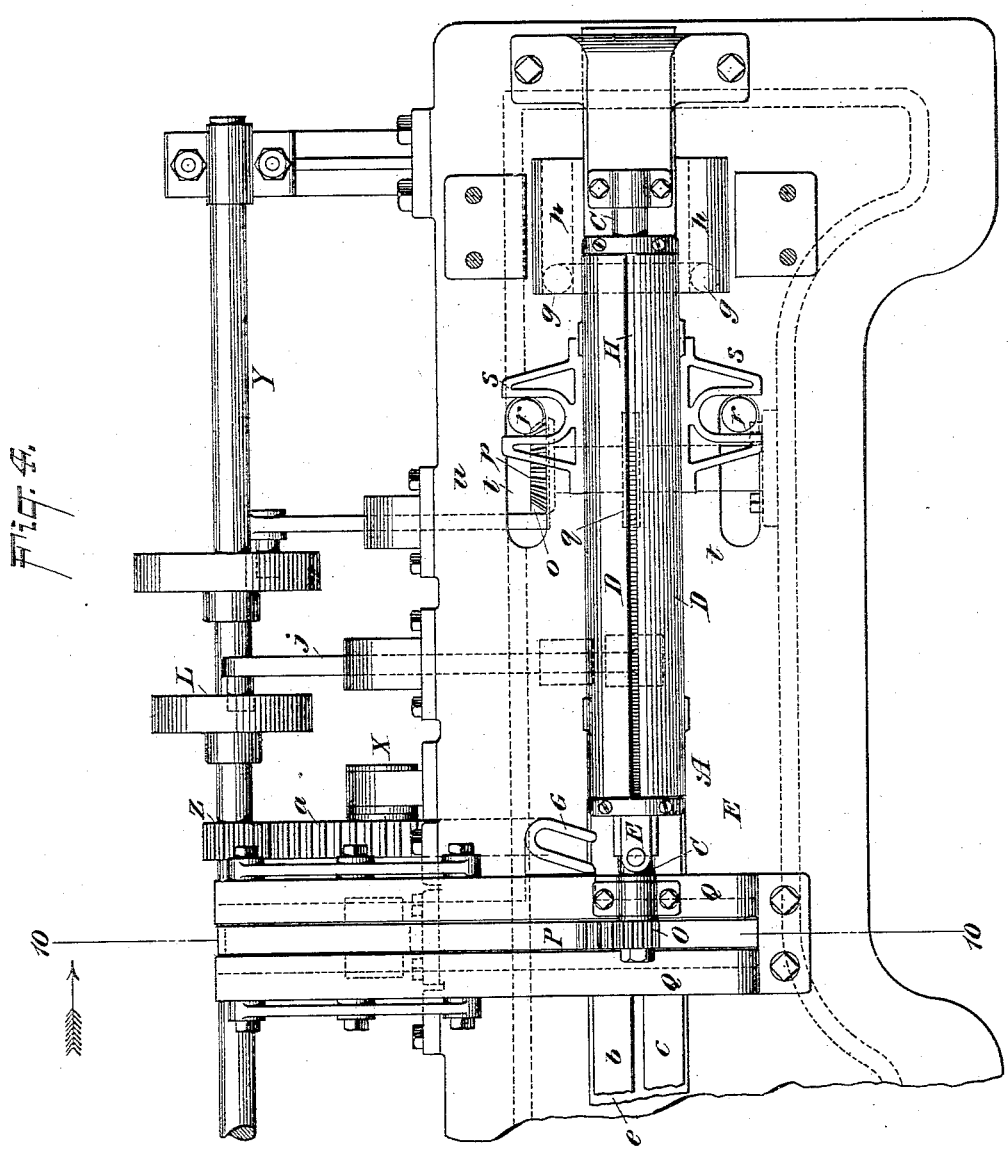
Figure 5:
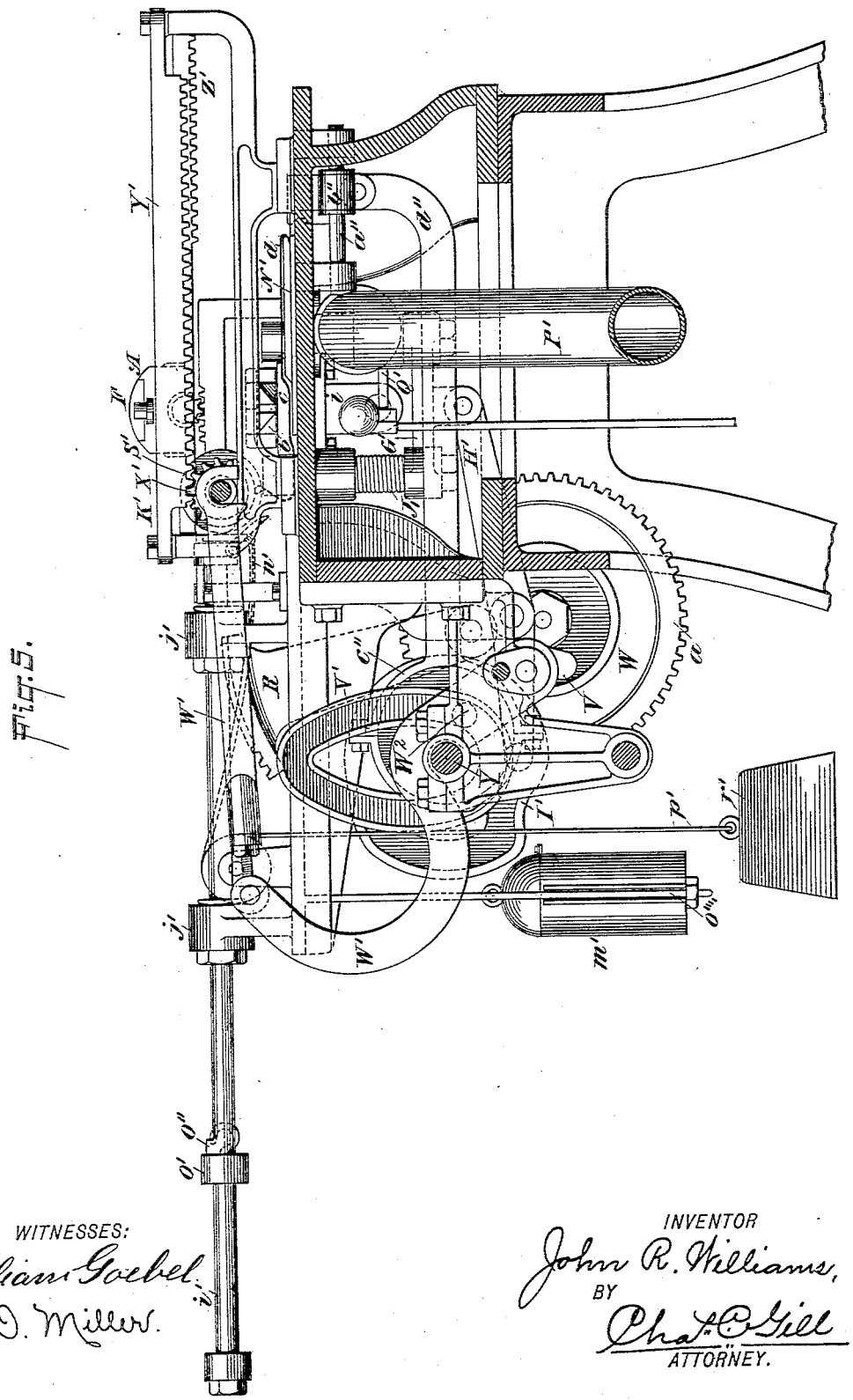
Figure 6:
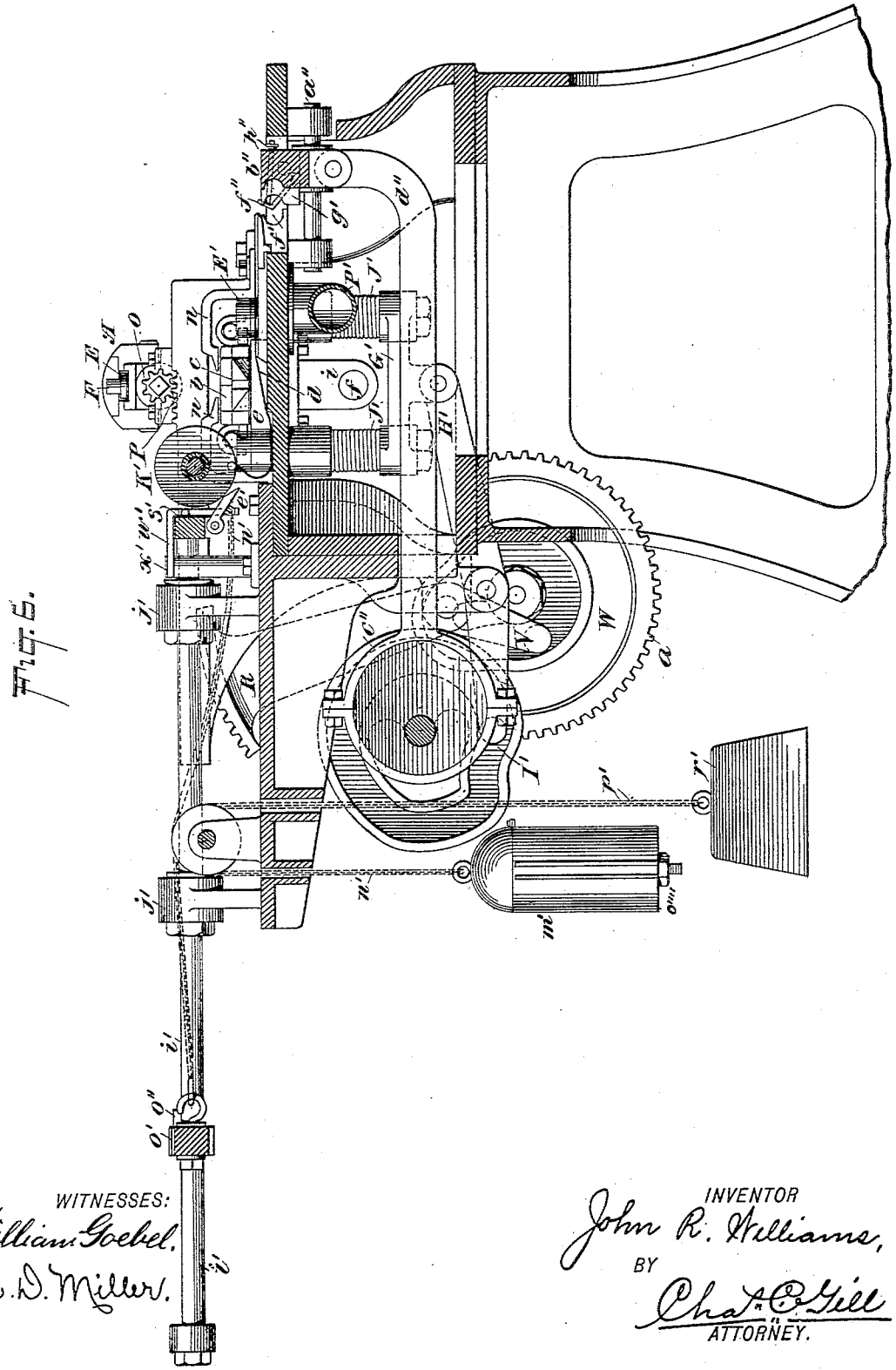
Figure 7:
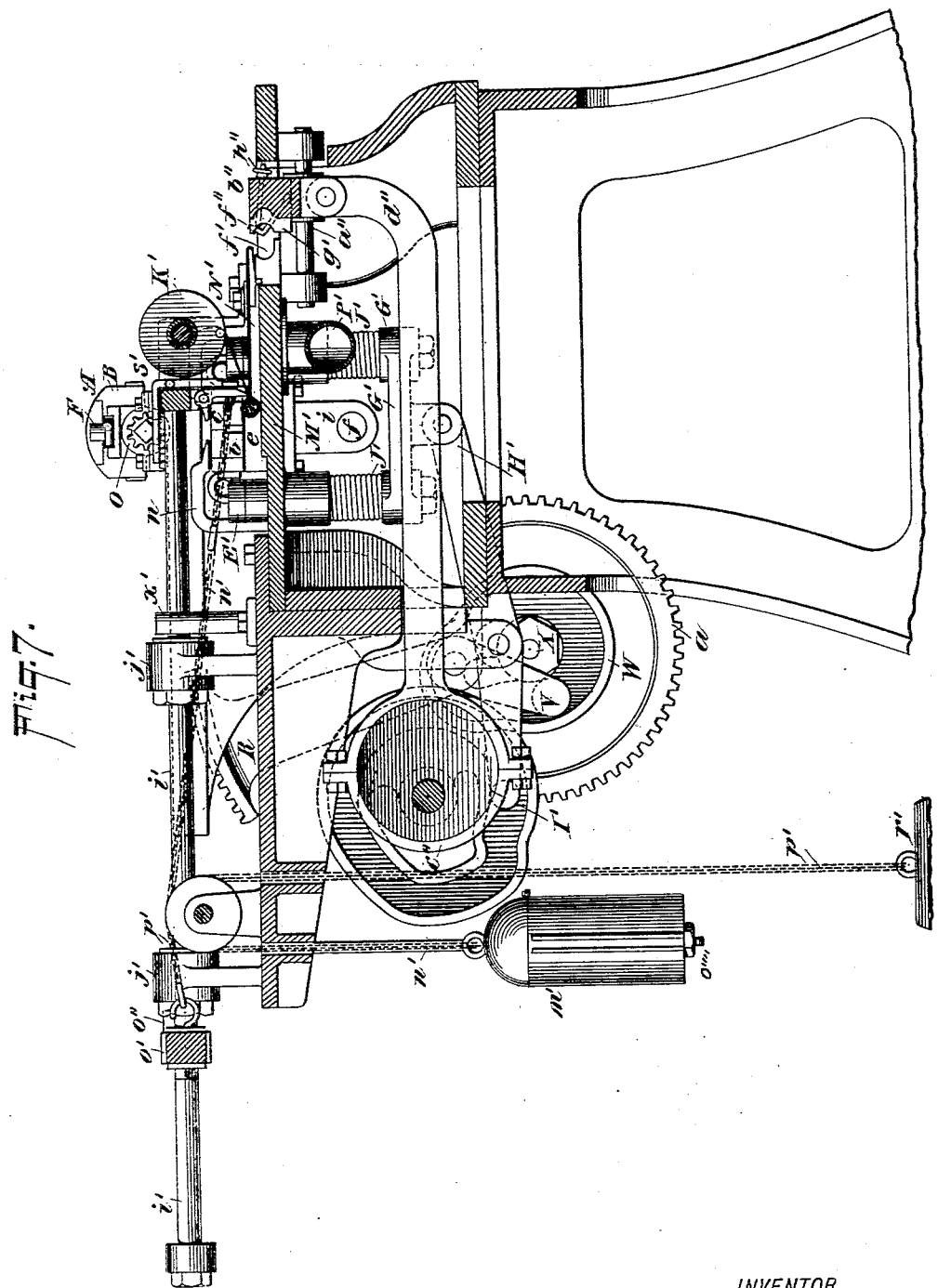
Figure 8:
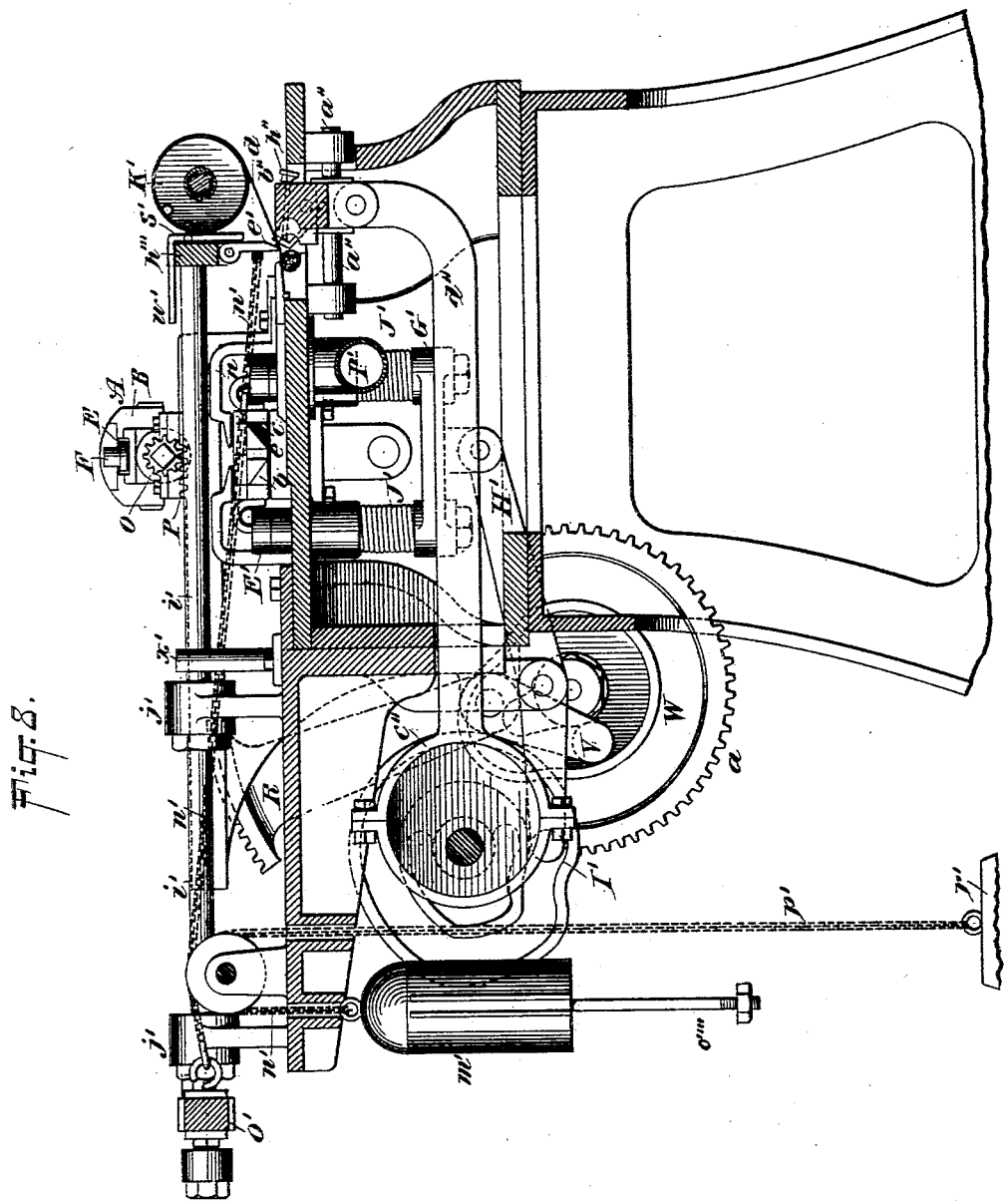
Figure 9:
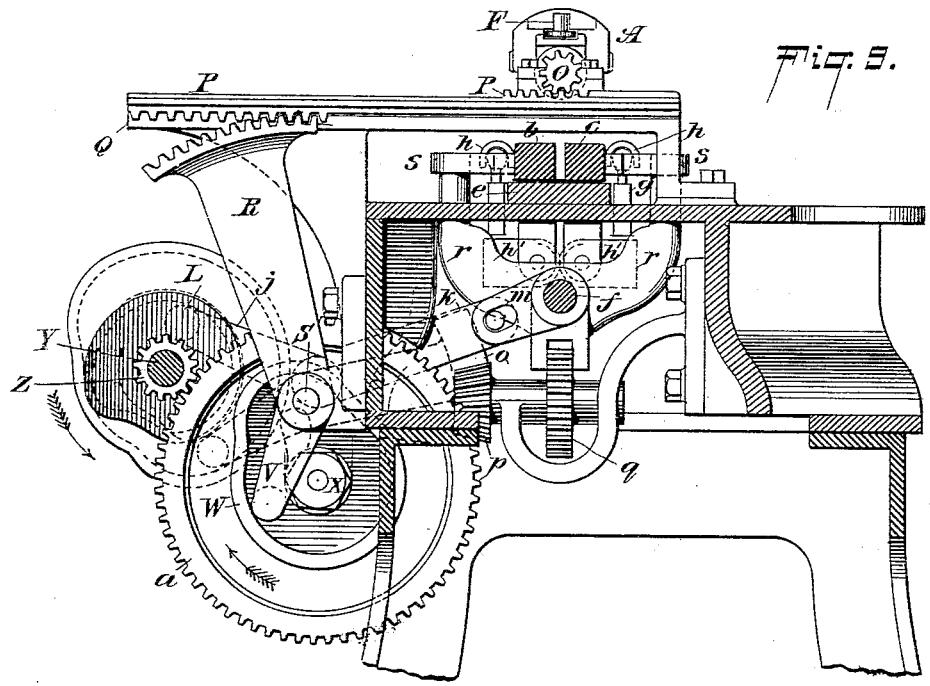
Figure 10:
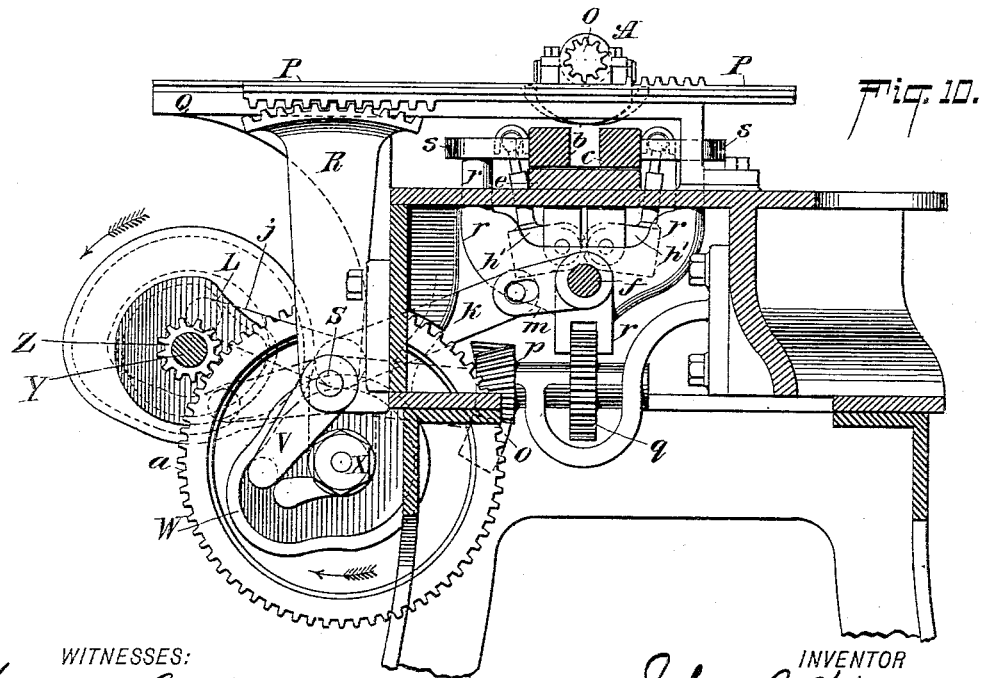
Figure 19:
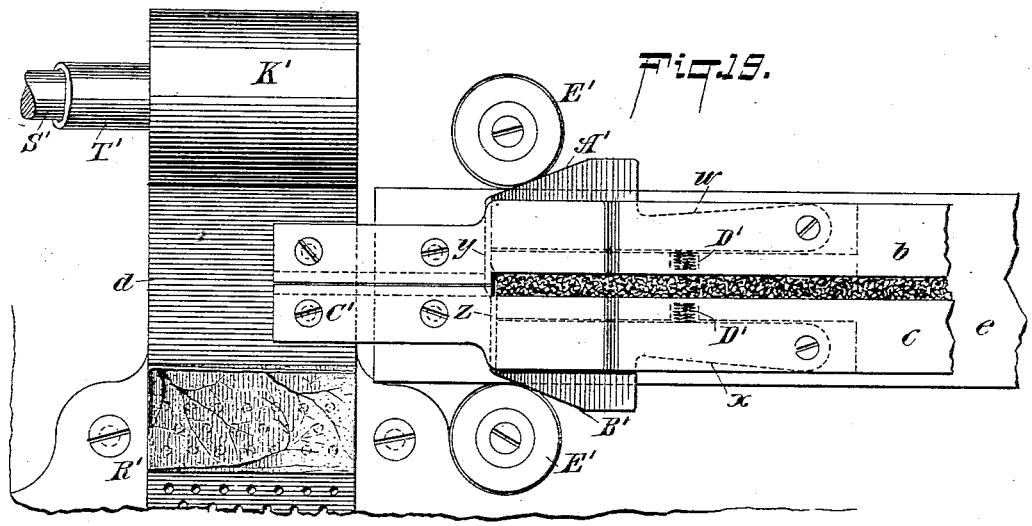
Figure 20:
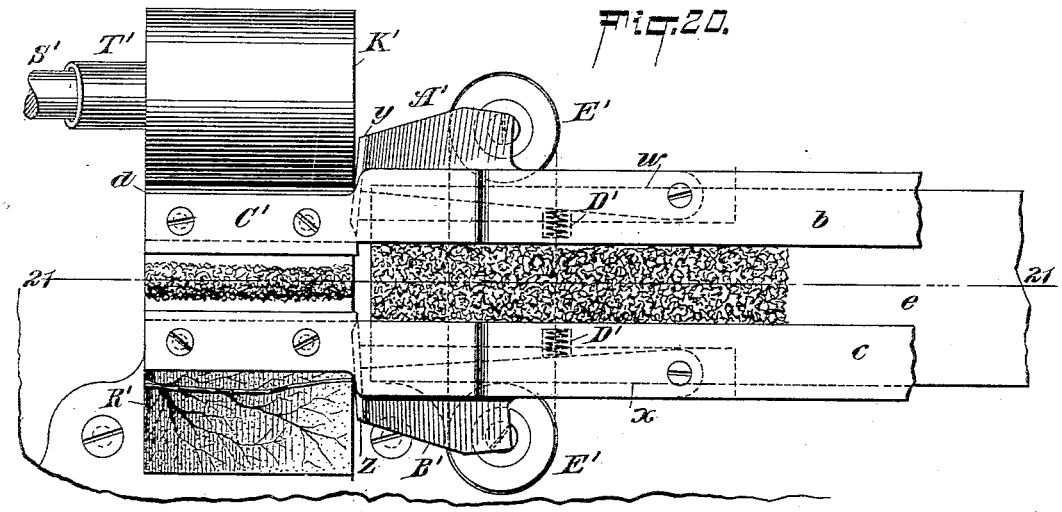
Figure 21:
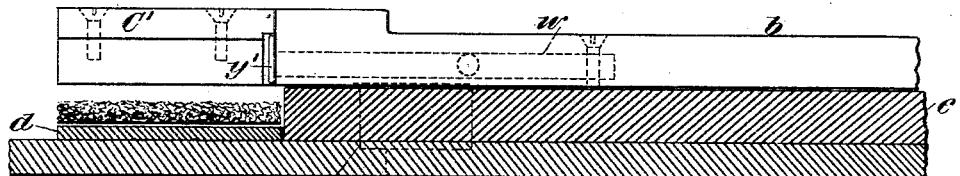
Figure 22:
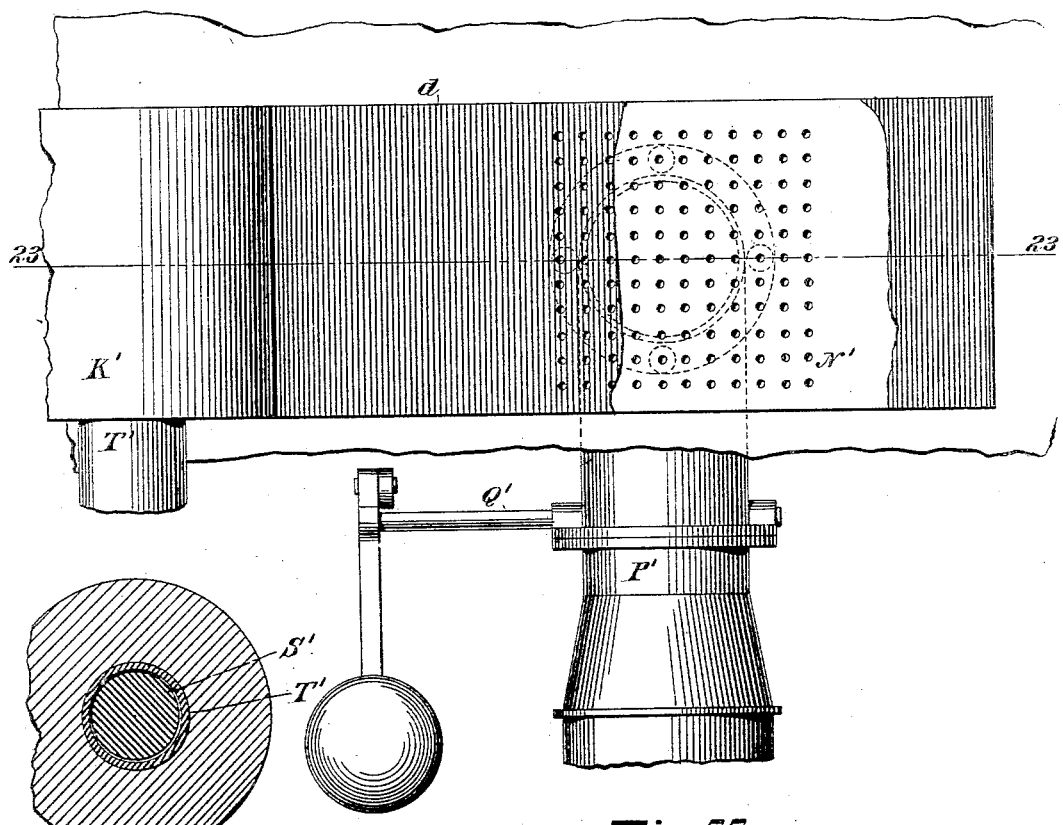
Figure 23:
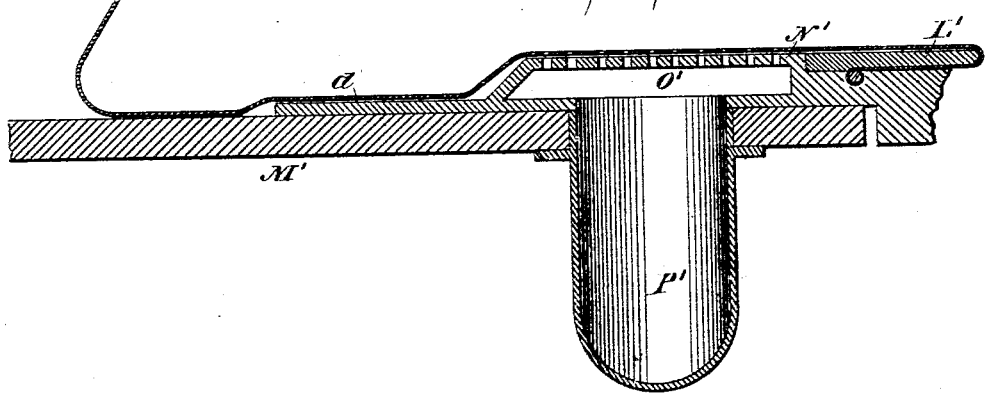

Referring to the accompanying drawings: Figure 1 is a front view of a machine constructed in accordance with and embodying the invention, a portion of the supporting frame being broken away to more fully disclose the operative mechanism. Fig. 2 is an end view of same. Fig. 3 is a top view, partly broken away, of same, the right hand end of the machine being removed. Fig. 4 is a top view of the right hand end of the machine, showing that portion thereof not represented in Fig. 3. Fig. 5 is a vertical section of the machine on the dotted line 5—5 of Fig. 3. Fig. 6 is a vertical section of same on the dotted line 6—6 of Fig. 3, the parts of the mechanism being shown in the position they occupy prior to the commencement of the operation of rolling the cigarette. Fig. 7 is a like view of same, showing the parts of the mechanism in position rolling the cigarette. Fig. 8 is a like view of same, showing the position of the parts immediately on the conclusion of the rolling operation and before the same have been returned to their first or initial position, which is that shown in Figs. 3 and 6. Fig. 9 is a vertical transverse section of the machine, showing particularly the mechanism for preparing and feeding the filler tobacco, the longitudinal jaws which move the elongated body of tobacco to the rolling apron being illustrated in their closed position. Fig. 10 is a like view of same (the section being on the dotted line 10—10 of Fig. 4) the said longitudinal jaws which carry the elongated body of tobacco being in this view shown in their open or separated position. Fig. 11 is an enlarged vertical transverse section on the dotted line 11—11 of Fig. 1, showing the oscillatory elongated receiver in its upper position ready to receive the filler tobacco and the longitudinal feeding jaws below the same in their closed position. Fig. 12 is a similar enlarged transverse section on said line 11—11, the said oscillatory receiver being shown in its inverted position ready to discharge the filler tobacco between the longitudinal feeding jaws after the latter shall have sufficiently opened from each other to receive the same. Fig. 13 is a similar enlarged transverse section on said line 11—11, showing the opposite sides of the said oscillatory receiver open to discharge the filler tobacco and the longitudinal feeding jaws separated to receive the same. Fig. 14 is an enlarged vertical transverse section on the dotted line 14—14 of Fig. 1, showing the oscillatory receiver in its upper closed position above the closed longitudinal feeding jaws. Fig. 15 is a like section on said dotted line 14—14, showing the oscillatory receiver in its lower open position above the open longitudinal feeding jaws. Fig. 16 is a detached enlarged top view, partly in section, of the oscillatory receiver, the sides thereof being shown in their closed position ready to receive the filler tobacco. Fig. 17 is a like view of same, showing said oscillatory receiver in its inverted position (its lower side being then upward) with its opposite sides in their normal or closed condition. Fig. 18 is a like view of same, but showing the opposite sides of the receiver in the open or separated position discharging the filler tobacco. Fig. 19 is an enlarged detached top view of a portion of the rolling apron, its table, a binder or wrapper on the apron, the knives severing a length of the tobacco, and the longitudinal feeding jaws, the latter being in their closed position holding the filler tobacco and traveling upon the said rolling apron. Fig. 20 is a like view of same, the knives being opened from each other, and the feeding jaws having traveled entirely across the rolling apron and opened from each other to deposit thereon sufficient tobacco for the filler of a cigarette. Fig. 21 is a longitudinal section of same on the dotted line 21—21 of Fig. 20. Fig. 22 is an enlarged top view of a portion of the rolling apron, its table, carrying roller and connections for air suction, the latter to act upon the binder or wrapper during the process of rolling. Fig. 23 is a vertical longitudinal section of same on the dotted line 23—23 of Fig. 22. Fig. 24 is a central vertical longitudinal section through the cigarette rolling mechanism, the latter being shown in its first position, with the wrapper and charge of filler tobacco on the rolling apron. Fig. 25 is a like view of same, showing the mechanism in the position it occupies just as the filler tobacco is being rolled upon the edge of the wrapper. Fig. 26 is a vertical section of same on the dotted line 26—26 of Fig. 24 looking toward the left. Fig. 27 is a vertical section on the dotted line 27—27 of Fig. 25 looking toward the left. Fig. 28 is a central vertical longitudinal section through the cigarette rolling mechanism, the latter being shown in the position it occupies at the conclusion of the operation of rolling a cigarette and after the latter has fallen from the table into its receiving pocket preparatory to being there held and trimmed at its ends. Fig. 29 is a like section on an enlarged scale of a portion of said mechanism, showing the cigarette in the same position it is represented as occupying in Fig. 28, but the knives having advanced to trim the ends thereof. Fig. 30 is a like section of same, the knives having receded and the cigarette having been freed and allowed to fall from the pocket. Fig. 31 is a top view, partly broken away, of that portion of the rolling table and mechanism below the dotted line 31—31 of Fig. 28. Fig.

Figure 34:
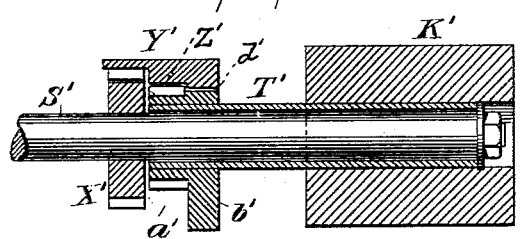
Figure 35:
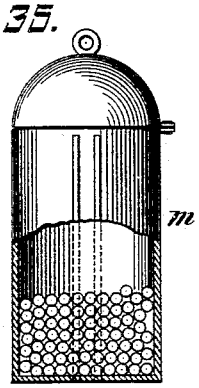
Figure 36:
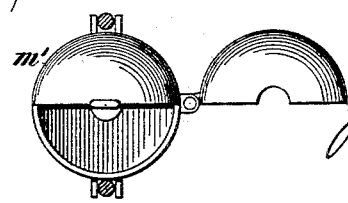

32 is a side elevation of the frame receiving the extended spindle of the apron carrying roller and gearing on said spindle, the latter being in section and this figure showing the position of the parts while at one end of said frame. Fig. 33 is a like view of same, showing the position of the parts when at the opposite end of said frame. Fig. 34 is a detached vertical section of the said spindle and gearing on the dotted line 34—34 of Fig. 32. Fig. 35 is a side elevation, partly in section, of a weight used in the machine and hereinafter referred to, and Fig. 36 is a top view, with the lid open, of same.

In the accompanying drawings, referring particularly to Figs. 1 and 4 and 11 to 18 inclusive, the letter A designates the oscillatory elongated receiver for filler tobacco, and this receiver comprises the frame B, the spindles C, C, connected with the ends thereof, the opposite sides D, D, having a spring tension toward each other, and the cam slide E having a stud F and adapted under the action of the cam G to separate the sides D, D, to the open position shown in Figs. 13, 15 and 18.

The receiver A is adapted to have an oscillatory movement on the spindles C, C, as hereinafter described and it is proposed to make it of such length that the pocket H formed in the facing edges of said sides will receive enough tobacco, in length, to form five cigarettes. The depth and width of the pocket H should be such as to hold just enough tobacco for the thickness of the cigarette, and this tobacco will be placed in the pocket H while the latter is in its closed position shown in Figs. 14 and 16, and the receiver A is in its upward position.

The sides D, D, are, as shown, supported in the frame B, and are provided with downwardly extending lugs I, which pass through transversely elongated slots J and are connected by coiled springs K whose tension is exerted to draw said sides D, D toward each other.

Between the lower facing portions of the sides D, D, is placed the cam slide E having inclined edges M which meet the similar edges N formed on said sides, as indicated more clearly in Figs. 16 and 17, and operate when driven against the said edges N to separate the sides D, D, and permit the discharge of the tobacco, as shown in Figs. 15 and 18. In operation the slide E has a longitudinal movement, and when moved toward the right pushes the sides D, D, apart or to their open position, while when moved toward the left the said slide draws the inclined edges M back into the recesses provided for them, as shown by dotted lines in Figs. 16, 17 and 18, thus permitting the springs K to close the sides D, D, together.

For the purpose of effecting the longitudinal movement of the slide E, there is provided the inclined hook-shaped cam G, which, when the receiver A is in its inverted position, engages the stud F on said slide E and first moves the same inward, as shown in Fig. 18, to open or separate the sides D, D, and then draws the same outward to the position shown in Fig. 17, permitting thereby the said sides D, D, to close together under the action of the springs K. The cam G is given a reciprocating movement toward and from the stud F by reason of its being rigidly connected with the reciprocating sliding rack P, hereinafter referred to, which not only carries said cam G but serves to oscillate the receiver A in the manner hereinafter described.

Upon the left hand spindle C of the oscillatory receiver A is secured the pinion wheel O, which engages the horizontal transversely reciprocating slide-rack P, mounted in the bearings Q and adapted to be actuated by the toothed segment R whose upper curved surface engages the teeth upon the lower surface of said slide P. The form of the sliding rack P is illustrated more clearly in Figs. 1, 9 and 16, and from these figures it will be observed that said sliding rack is a strip of metal having teeth upon its upper surface at one end to engage the said pinion O, and teeth upon the lower surface of its other end to engage the segmental rack R. The rack R is secured upon the short axle S having rigidly secured upon it the arm V, shown in Fig. 9, which is engaged by the cam W secured upon the axle X. The axle X and cam W travel in the direction of the arrow illustrated in Figs. 9 and 10, and receive their motion from the driving shaft Y through the instrumentality of the pinion wheel Z and spur gear wheel $a$. Upon the rotation of the driving shaft Y the pinion Z will actuate the gear wheel $a$ and cam W and thus, owing to the formation of the latter, the arm V will cause the rocking of the axle S and the oscillation therewith of the toothed segment R, the effect being that the movement of the said toothed segment R will cause a sliding reciprocating movement of the rack P and through the same rotate the pinion wheel O and cause the receiver A to turn from its normal or upper position shown in Figs. 11 and 14 to its inverted position illustrated in Figs. 12 and 15. The relative dimensions of the pinion Z and spur gear wheel $a$ are such that the segmental rack R is not actuated with every revolution of the driving shaft Y to invert the receiver A, but on the contrary the parts are so timed that the receiver A will not be moved except after the formation of every five cigarettes. The oscillating movement of the receiver A is timed with respect to the operation of the longitudinal feeding jaws $b$, $c$ as hereinafter explained. The tobacco for the filler of the cigarettes is placed within the groove H of the receiver A when the latter is in its upward position with its sides D, D, closed together, as illustrated in Figs. 11 and 14, the tobacco being lightly pressed within said groove H and completely filling the same. The length of the groove H may vary in accordance with the wishes of the manufacturer, but it is recommended that said groove be sufficient in length for the formation of five cigarettes. At the proper time the receiver A is, through the medium of the segment R, and rack P, inverted or turned downward to the position shown in Figs. 13 and 15, when the sides D, D, as hereinbefore described, will open to permit the discharge of the tobacco. Thereafter, the said sides D, D, through the action of the springs K will be closed together and the receiver be returned to its upper position by the reverse movement of the said segmental rack R and sliding rack P. The receiver A deposits the filler tobacco between the sliding jaws b, c, which convey it to the rolling apron d, as illustrated more clearly in Figs. 3, 19, 20 and 21. The longitudinal feeding jaws b, c, consist of two longitudinal bars resting upon the table e, and adapted to have a longitudinal reciprocating movement and a lateral movement from each other, the former being to transmit the filler tobacco in severed charges to the apron d, and the latter to free the said tobacco, as illustrated in Figs. 20 and 21, in order that a definite charge thereof may fall and remain upon said apron and the main body of tobacco be undisturbed during the return of said feeding jaws b, c, from across said apron. The jaws b, c, correspond with each other and are uniform in character throughout and when in their normal position are separated by a space, as illustrated in Fig. 19, about equal to the thickness of the cigarette to be produced. The normal position of the jaws b, c, is centrally beneath the receiver A, as illustrated in Fig. 14, and the mechanism of the machine is so timed that when the said receiver is inverted to discharge its rod or body of filler tobacco from the groove H, the said jaws b, c, will separate, as illustrated in Fig. 15, in order to conveniently receive the tobacco from said groove H. Upon the return of the receiver A to its upper position the jaws b, c, will again close to the position illustrated in Figs. 14 and 19, and thus lightly compress the tobacco and bind against the same in order that when the said jaws b, c, are given their longitudinal movement they will carry the tobacco between their facing sides. The jaws b, c, receive their lateral motion toward and from each other from the shaft f, rocking arms g, g and curved plates h secured to the outer opposite sides of said jaws b, c, and adapted to receive the upper ends of said arms g, g. The arms g, g, extend upward from the pivotally mounted racks h', h', as illustrated more clearly in Figs. 11, 12 and 13, and are provided upon their inner facing edges with intermeshing teeth which insure a simultaneous motion in the arms g, g, when said racks are actuated by the teeth on the shaft f during the rotation of the latter. The jaws b, c, may be provided with as many of the pairs of arms g, g, as may be desired, but I have found that if two pairs of such arms g, g, are employed, the motion of the jaws b, c, will be uniform throughout and satisfactory, and hence, in the drawings, I illustrate but two pairs of said arms g, g, with their connecting devices. The plates h, h, which receive the upper ends of the arms g, g, are elongated in form in order that the jaws b, c, may have their due longitudinal movement back and forth without exerting any strain upon the said arms g, g, and without said plates h, h, passing from contact with the upper ends of the said arms, as illustrated in Fig. 1. The shaft f has an oscillating or rocking motion in the bearings i, receiving the same from the cam L on the driving shaft Y through the instrumentality of the arms j, k, and lug m, the latter being rigidly secured on the said shaft f, as illustrated in Figs. 9 and 10, and being loosely jointed to the outer end of said arm k. Upon the rotation of the driving shaft Y, the cam L first engaging the said arm j, will actuate the same, and thereby effect the movement of the arm k, lug m, and shaft f, the latter receiving its movement to open the jaws b, c, at the end of each stroke of said jaws b, c, across the rolling apron d. As above described, when the jaws b, c, extend across the rolling apron d, they open to permit the deposit of the charge of filler tobacco upon said apron, as illustrated in Figs. 20 and 21. After the charge of the filler tobacco has been deposited upon the apron d, the said jaws b, c, while open travel back from across the apron d and thereafter again close against the remaining portions of the tobacco left between them. The jaws b, c, are retained in proper position upon the upper surface of the table by means of the arms n, n, illustrated in Figs. 3 and 11, and said jaws receive their longitudinal movement from the main driving shaft through the medium of the segment gear o, beveled gear wheel p and gear wheel q, the latter as shown in Figs. 1, 9 and 10, engaging the lower grooved rack surface of the slide r, which slide is bifurcated, its two arms extending upward upon opposite sides of the bed e and engaging the horizontal grooves in the frames s, the latter being rigidly secured to the opposite outer faces of the jaws b, c, as illustrated more clearly in Figs. 1 and 4. The arms of the slide r extend upward through elongated slots t formed in the bed supporting said bed e, the purpose of said elongated slots being to permit the unobstructed travel of the slide r and jaws b, c. The grooves in the frames s are elongated transversely in order that the arms of the slide r will not become disengaged therefrom whether the jaws b, c are in their open or closed position. The left hand ends of the jaws b, c, are recessed upon opposite sides and contain the pivoted bars w, x, shown by dotted lines in Figs. 19 and 20, which bars carry upon their outer ends the knives y, z, and cam surfaces A', B', and beyond the vertical plane of the knives y, z. The jaws b, c extend to the left as indicated at C', a distance equal to the length of the cigarette to be produced. That portion of the jaws $b$, $c$ which extends to the left of the knives $y$, $z$ may for convenience be called a head or extension, indicated by the letter C', and this head or extension is the portion of the jaws which travels back and forth across the rolling apron. The inner faces of the portion of the jaws designated as the head or the extension C' are parallel and correspond with the inner faces of the main body of said jaws at the right of the knives $y\ z$, but the jaws at the left of the knives $y\ z$ have plates fastened upon them, as shown in Fig. 3, which plates at their facing edges meet when the jaws $b\ c$ approach each other and thereby prevent the tobacco from escaping upward while being severed by the knives. The said plates also prevent the inner faces of the jaws $b\ c$ from too closely compressing the body of filler tobacco between them, but said plates constitute a detail to which the invention is not confined. The bars $w$, $x$, have a spring tension outward by reason of the coiled springs D', and hence said bars $w$, $x$, when in their normal position will be at such angle to the longitudinal center of the jaws $b$, $c$, that the knives $y$, $z$, will be free of the filler tobacco and separated from each other. The object of the knives $y$, $z$, is, when said knives are pressed toward each other, to sever a sufficient length of the filler tobacco to form one cigarette, and this operation of the said knives only occurs when the head or extension C' of the jaws $b$, $c$, is passing to position across the apron $d$, preparatory upon the separation of the said jaws $b$, $c$, to deposit said charge of tobacco upon said apron in proper position to insure its being rolled in the binder. The knives $y$, $z$, are forced inward toward each other to sever the charge of tobacco by the contact of the cam edges A', B', with the rollers E', the latter being in the path of said surfaces and being met by them at each movement of the jaws $b$,$c$, across the apron $d$. The rollers E' are mounted upon the upper ends of the spindles F' which are connected at their lower ends by the transverse bar G', as shown in Figs. 6, 7 and 8, in order that said spindles and said rollers may have a simultaneous vertical movement. After the knives $y$, $z$, have been pressed inward to sever the charge of tobacco, the rollers E' are drawn downward in order to free the cam surfaces A', B', and permit the springs D' to force the bars $w$, $x$ outward to the position shown in Fig. 20. The spindles F' and rollers E' are drawn downward from contact with the cam surfaces A', B', by means of the coiled springs J' and are pushed upward again by the pivoted arm H' and cam I', one end of said arm being engaged by said cam and the other end thereof being pivotally secured to the transverse bar G' connecting said spindles, as illustrated in Figs. 6, 7 and 8. The spindles F' are inclosed by the said coiled springs J', which exert a downward tension thereon and draw the rollers E' downward to their concealed position as soon as the cam I' during its revolution will permit such result. The sole object of the rollers E' is to force the knives $y$, $z$, inward to sever the length of tobacco for a cigarette and hence they simply form contacts for the cam surfaces A', B', and recede downward from said surfaces after the charge of tobacco has been severed. The form of the cam I' is such that it will permit the springs J' to hold the spindles F' and rollers E' in their lower position until the jaws $b$, $c$, have returned to their open condition from across the apron $d$ preparatory to their succeeding travel across said apron to carry another charge of tobacco for a further cigarette.

In order to more clearly explain the operation of the feeding jaws $b$, $c$, it may be considered that the said jaws are at their farthest position to the right, which is that illustrated in Fig. 3, the head or extension C' thereof being adjacent to the edge of the apron $d$; when the jaws $b$, $c$, are in this position and contain no tobacco the timing of the mechanism is such that the receiver A with its groove H, full of tobacco, will turn downward and the jaws $b$, $c$, having at such time opened, as shown in Fig. 15 through the instrumentality of the arms $g$, $g$, the said receiver will have its opposite sides D, D, separate and deposit its charge of tobacco upon the bed $e$, between the said jaws $b$, $c$. Thereafter the receiver A, will return to its upper position and the jaws $b$, $c$, will close to the condition in which they are illustrated in Figs. 3 and 19, in which it will be observed that the facing sides of said jaws are not in direct contact with each other but that they approach sufficiently near to each other to lightly compress the filler tobacco for the formation of cigarettes. The receiver A having returned to its upper position and the jaws $b$, $c$, having closed, as explained above, the slide $r$ will receive a traveling movement of definite length from the gear wheel $q$, and will through the medium of the frames $s$, $s$, communicate the same to the jaws $b$, $c$, and cause them to travel toward and move the head or extension C' across the apron $d$, to the extent illustrated in Fig. 20.

The elongated body of filler tobacco is deposited by the receiver A between the jaws $b\ c$, when the latter are at their extreme positions to the right, which is that shown in Figs. 1 and 4, and hence it will be noticed that at the starting of the operation of the machine and after one elongated body of filler tobacco has been deposited between the jaws $b\ c$, that portion of the said jaws at the left of the vertical plane of the left hand end of the receiver A not having been below the receiver will contain no tobacco; as a result of this condition the first few traveling or reciprocating movements of the jaws $b\ c$ will be required simply to move the body of filler tobacco to the left sufficiently for it to reach the left hand portion of, and be taken up by the jaws and their head or extension C', after which the operation will proceed regularly and continuously. At each movement of the jaws $b\ c$ to the left, to the position shown in Fig. 20, they being at such time in their closed position, will carry the body of filler tobacco to the left to an extent equal to their own movement, and since the jaws $b\ c$ open from each other prior to and remain thus open during their return movement to the right the filler tobacco will remain undisturbed until the jaws $b\ c$ when in their extreme position at the right again close and move toward the left, at which time they will carry the filler tobacco another distance to the left. The repeated movements of the jaws $b\ c$ to the left while in their closed position result in the body of filler tobacco being carried toward the left until its left hand end is between the portion of said jaws constituting the head $C'$ and thereafter each movement to the left of the jaws $b\ c$ causes the head $C'$ to carry a definite length of the filler across the rolling apron $d$, said length constituting the filler for one cigarette.

In Fig. 19, the jaws $b, c$, are illustrated as having moved the head or extension $C'$ partly across the apron $d$, with the knives $y, z$, forced toward each other severing that portion of the filler tobacco in the extension or head $C'$ from the remaining portion thereof in the space between the main body of said jaws. The movement communicated to the jaws $b, c$ by the slide $r$, is sufficient in extent to carry the head $C'$ across the apron $d$ and thereafter the said jaws $b, c$, will separate, as illustrated in Fig. 20 under the action of the arms $g, g$, leaving the severed charge of tobacco upon the apron $d$, and the main body of tobacco upon the table $e$. While in their separated position the jaws $b, c$, will, through the medium of the rack $o$, beveled gear wheel $p$, gear wheel $q$ and slide $r$, be returned on the bed $e$ to their former position, which is that illustrated in Fig. 3. During the return of the jaws $b, c$, to their initial position the facing sides thereof pass freely along the sides of the body of tobacco without materially disturbing the same, the tobacco being, while the jaws $b, c$, are separated, left upon the table $e$. After the return of the jaws $b, c$, to their initial position, they are closed together, as illustrated in Fig. 19, against the body of the tobacco, so as to be in condition to again travel across the apron $d$ and deposit a second severed charge for the filler of a cigarette. With each movement of the jaws $b, c$, across the apron $d$ a charge of tobacco for the filler of a cigarette is severed and deposited upon the apron $d$, and after each return movement of the said jaws to their initial position they close and bind against the body of tobacco sufficiently to move it along the bed and draw the end of said body across the said apron during the succeeding motion imparted to the jaws by the slide $r$.

The timing of the movement of the receiver A with that of the successive longitudinal movements of the feeding jaws $b, c$, is such that the said receiver will not discharge its tobacco into the space between the edges $b, c$, until the tobacco already therein below said receiver has been moved toward the apron $d$ and used for the fillers of cigarettes. It will thus be observed that the receiver A, does not become inverted in position with every reciprocating movement of the said jaws $b, c$, but only at such time as the body of tobacco fed to the jaws by said receiver has been entirely displaced from the space immediately below the same, in order that the elongated charges of tobacco from said receiver will not deposit one upon another on the bed $e$, but will be deposited in line with each other, and hence a uniform body of tobacco may be maintained between the jaws $b, c$, and the cigarettes made therefrom be of uniform diameter throughout.

The rolling apron $d$ is secured at one end to the roller $K'$ and at its other end beneath a section $L'$ of the table $M'$, as illustrated more clearly in Figs. 24, 28 and 29. That portion of the table $M'$ upon which the rolling apron $d$ is moved is lettered $N'$, and, as shown, is elevated above the surrounding portions of the main table $M'$. The elevated table $N'$ is of a width equal to that of the rolling apron $d$ and is perforated over its upper surface, as illustrated in Figs. 3, 28 and 31.

Below the table $N'$ is provided the air space $O'$ and this, by means of a pipe $P'$, is connected with a suction blower (not shown). The pipe $P'$ is provided with a suitable cut-off valve $Q'$ shown more clearly in Figs. 3 and 22, the valve being of ordinary construction and intended to close the pipe $P'$ when it is desired to cut off the air suction from the perforated table $N'$. That portion of the rolling apron $d$ which rests upon the table $N'$ is perforated, as illustrated in Fig. 3, to correspond with the perforations in the table $N'$ in order that the air suction may act upon the binder or wrapper $R'$ when the latter is in position thereon, as illustrated in Figs. 24 and 25. The effect of the air suction is to hold the wrapper or binder $R'$ evenly and regularly upon the apron and to insure the formation of properly wrapped cigarettes or cigars. In the present instance, where the cigarettes are to be of the usual small size, it is desirable that the binder be held by some positive force upon the apron $d$ in order that the movement of the machinery or of the attendant or of any passing object shall not displace the same, or disturb its regularity of position on the apron $d$. In instances where cigars are to be rolled by means of the apron $d$, the binder or wrapper would, of course, be of larger size and under such circumstances, the air suction will have a beneficial effect in keeping the binder or wrapper smooth and insuring its being wrapped around the filler evenly and regularly and in a manner which will tend to the perfection of the finished product. The roller $K'$ is mounted upon the inner end of a longitudinal shaft or spindle S', which, as illustrated in Fig. 3, extends from within the roller K', to the left hand end of the main bed plate of the machine. The roller K' is hollow and carries the sleeve T' to which it is secured and which encompasses the shaft S', the latter being revoluble within said sleeve. During the operation of the machine the roller K' is adapted to have for a portion of its line of travel, a direct reciprocating movement drawing the apron after it, the reciprocating spindle S', during such movement revolving within the sleeve T' but not imparting a revoluble movement to the sleeve T' and roller K'; and during a further movement of the roller K' it will, in addition to having its reciprocating movement, revolve and tighten or loosen the apron $d$, according to whether it is traveling toward the front edge of the table N' or receding therefrom. The shaft or spindle S' receives its reciprocating movement from the cam V' mounted on the main driving shaft Y, and connecting arms W' extending from the said cam to the said spindle S', as illustrated more clearly in Figs. 3 and 5. The lower arm W' carries a well known form or stud $W^2$ (Fig. 5) which enters the groove of the cam V' and hence during the revolution of the shaft Y the said cam will actuate the arms W'. The said arms W', cam V' and stud extending from the arm into the groove of the cam are well known in the art and are shown in Letters Patent No. 401,090, of April 9, 1889; No. 419,742, of January 21, 1890, and No. 422,000, of February 25, 1890, granted to me for cigar bunching machines. The operation of the cam V' is to cause the arms W' to impart a direct reciprocating movement to the spindle S' and roller K' and in order that the said spindle may maintain a uniform longitudinal position during its travel, it is provided with pinion wheels X', X', engaging the downwardly extending teeth in the racks Y', Y', the latter extending transversely across the left hand end of the main bed plate of the machine. During the reciprocating movement of the spindle S' the pinions X', X', will engage the racks Y' and be thereby rotated, a corresponding movement being imparted to the spindle S' which is prevented from communicating a like motion of the roller K' by reason of the fact that its end revolves within the sleeve T', to which the said roller is secured.

Figure 32:
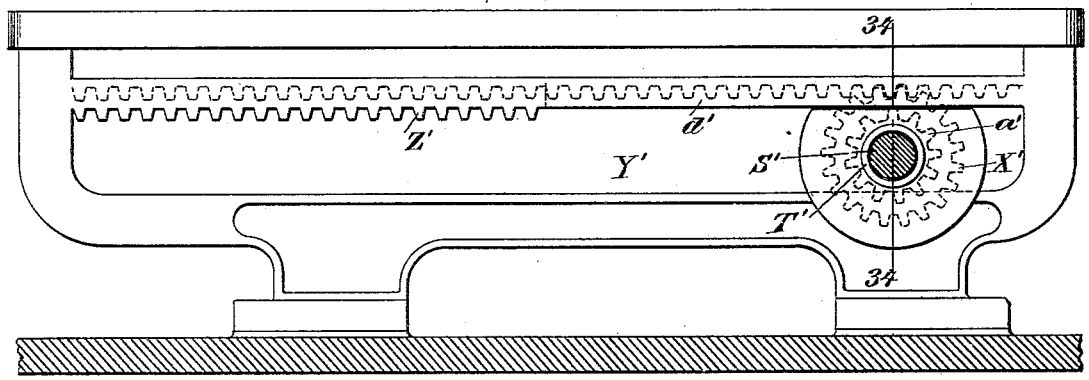
Figure 33:
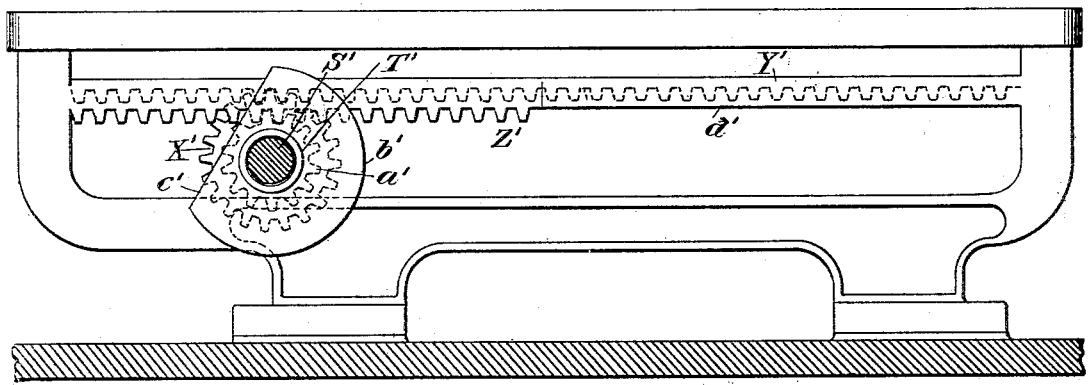

Upon the inner rack Y' is provided a lower row of teeth Z', as shown more clearly in Figs. 32 and 33 which engages the pinion $a'$ secured rigidly upon the sleeve T', and at the proper time, through said sleeve, rotates the roller K' and winds or unwinds the apron $d$ in accordance with whether the said roller is traveling to the front edge of the table N' or receding therefrom. Upon the said sleeve T' is also provided the roller $b'$ which may form a part of the pinion $a'$ if desired, and turns freely with the sleeve during such time as the pinion wheel $a'$ is engaged by the teeth Z', and at other times said roller $b'$ has its flattened surface $c'$ in contact with the horizontal surface $d'$ formed on the rack Y'.

In Fig. 32 the roller $b'$ is illustrated with its flattened surface $c'$ in contact with the horizontal plane surface $d'$, and at such time, looking at Fig. 32, if the said spindle S' were moved toward the left, it would be revolved by its pinion X' engaging the higher teeth of the rack Y' and the said flattened surface $c'$ would slide on the plane surface $d'$, and operate as a check to prevent any rotation of the sleeve T' and roller K'. Thus, the spindle S' and roller K' would have a direct reciprocating movement until the said flattened surface $c'$ of the said roller $b'$ should pass beyond the range of the surface $d'$, at which time the pinion $a'$ would immediately engage the teeth Z', which, during the further movement of the spindle S' would rotate the sleeve T' and roller K', and thus operate to wind or tighten the apron $d$ upon the roller K'. As illustrated in Fig. 3, the flattened surface $d'$ extends outward beyond the vertical plane of the main body of the rack Y', and hence when the roller $b'$ passes beyond said surface it is left free and clear to rotate along the side of said rack, while the pinion $a'$ engages the teeth Z' immediately adjacent thereto.

From the foregoing description it will be clear that during about the first half of the movement of the roller K', toward the front of the machine, it will not revolve but simply reciprocate and draw the apron $d$ after it, and that, during the latter portion of the travel of said roller K', toward the front edge of the machine, it will be caused to revolve by the pinion $a'$ and teeth Z', and thereby wind the apron upon itself (the roller K') and tighten the same. The first positions of the roller K' with relation to the apron $d$ is illustrated in Figs. 24 and 25, and thereafter, as described above, the said roller K' is caused to revolve and, as illustrated in Fig. 28, wind or take up the apron $d$. During the return of the roller K' to its initial position in rear of the table N', the engagement of the pinion $a$ with the teeth Z' will operate the roller K' in a reverse direction during the first portion of its line of travel and thus unwind the said apron, and thereafter the flat surface $c'$ of the roller $b'$ will meet the horizontal plane surface $d'$ on the rack Y' and prevent any further rotation of the roller K' while permitting its due reciprocating movement to the completion of its return to the initial position. The roller K' thus winds upon itself the apron $d$ during the latter portion of its movement in the operation of rolling a cigar or cigarette and unwinds the same during the first portion of its return movement to its former position. The object of thus winding the apron $d$ upon the roller K' during the latter part of its movement is to permit the use of an apron of the maximum length upon a table of the minimum length, and with the minimum amount of travel in the devices carrying the said apron.

In the absence of the winding and unwinding of the apron on and from the roller K' as described above, it would be necessary that said roller have a much longer line of travel in order to accomplish the proper rolling of the cigarette, and hence, a much longer table N' would have to be employed; but with means provided for rolling the apron $d$, as it accomplishes its work upon the cigarette, I am enabled to use a comparatively long apron on a short table and with a limited traveling movement in the devices carrying the said apron.

The roller K' does not roll the cigarette or bunch, but is used to carry the apron $d$ and effect the rolling of the cigarette in the loop of the apron, as illustrated in Fig. 25. The pressure necessary to the formation of the cigarette is derived from a compressor blade $e'$, which, as illustrated more clearly in Figs. 24 to 27 inclusive, is pivotally mounted and provided with means whereby, during the first portion of the movement of the roller K', it is held elevated and kept above the horizontal plane of the charge of filler tobacco deposited upon the apron $d$, and during the latter portion of the travel of the roller K' it (the blade $e'$) is caused to descend in front of said charge of filler tobacco, and to close the loop of the apron $d$ around the same, tightly compressing the said charge of tobacco until completely rolled within the binder or wrapper R'. The first position of the compressor blade $e'$ is illustrated in Fig. 24, and its first position, when in active use, is illustrated in Fig. 25, while, in Fig. 28, the said compressor blade is illustrated as having passed beyond the rolled cigarette, which is moved by the apron $d$ over the edge of the plate L' and allowed to fall into the pocket $f'$ provided to receive it preparatory to having its ends trimmed by the reciprocating knives $g'$ as hereinafter explained. The compressor blade $e'$ is carried by the bar $h'''$ secured upon the front ends of the reciprocating rods $i'$, which, as illustrated in Figs. 2, 5 and 24 are mounted in the elevated sleeves $j'$ the latter serving as bearings and to permit the said rods $i'$ to have a direct reciprocating movement in line with the apron $d$, the purpose of said reciprocating movement being to permit the proper reciprocation of the compressor blade $e'$ during the operation of rolling the cigarette. The compressor blade $e'$ is given a spring tension upward by means of a coiled spring $k'$, and this upward tension is overcome at the proper time by means of a weight $m'$ connected by the chain $n'$ with the lower portion of said blade. The weight $m'$ is suspended between rods $o''''$ (Fig. 5) which permit it to have a vertical movement, and afford a stop for the same after the said weight has descended to the proper position, and the object of this construction is to provide means whereby the force of the weight will not act upon the compressor blade $e'$ except at such time as it may be desired to have the edge of said blade drawn downward and bind upon the loop and form the bight in the apron $d$; hence, in Fig. 24, it will be noticed that the chain $n'$ is in a slackened condition, the weight $m'$ at such time being at rest upon its stop, and not drawing on the said chain or on the compressor blade $e'$, while in Fig. 25 the said chain is shown drawn taut, and this is due to the fact that the rods $i'$ and blade $e'$ have traveled forward in the operation of rolling the cigarette, and the weight $m'$ has been lifted from its stop and is exerting its entire force on the blade $e'$ to hold its lower edge down against the loop in the apron $d$, containing the charge of filler tobacco being rolled into the binder R'. It will be apparent that the weight $m'$ should vary in accordance with the amount of pressure it is desired shall be exerted on the charge of filler tobacco during the rolling of the cigarette; and any desirable form of weight $m'$ may be made use of, but I recommend that the said weight be in the form of a hollow shell having a hinged cap, as illustrated in Figs. 35 and 36, and contain a quantity of shot, as shown. By the employment of the shot in the hollow weight $m'$ it will be obvious that the extent of the pressure exerted on the compressor blade $e'$ and consequently on the filler tobacco, may be regulated at will. The rods $i'$ are connected at their rear portion by a cross bar as shown in Fig. 6, and between this cross bar and the rear sleeve $j'$ is the cross bar $o'$, shown in Figs. 3, 5 and 7, which is loose on the rods $i'$, but has a bearing at its ends against the studs $o''$ formed on the said rods, and from the cross-bar $o'$ the chains $p'$ extend over the pulleys $q'$, and downward to the weights $r'$, the force of the weights being exerted to draw the rods $i', i'$ toward the roller K' during the forward travel of the latter with the rolling apron $d$ during the operation of rolling a cigarette. During the forward travel of the roller K' and apron $d$ the weight $m'$ is gradually drawn upward and the weights $r'$ are gradually lowered, as illustrated in Fig. 7, and during the return movement of the rods $i', i'$, to their rear or initial position, a reverse movement of the said weights occurs, the weight $m'$ being gradually lowered to its stop or point of rest, and the weights $r'$ elevated to the position shown in Fig. 6. The weight $m'$ simply acts on the compressor blade $e'$, while the weights $r'$ are the motive forces which carry the rods $i'$ and compressor blade $e'$ forward to that point at which the said blade is turned downward in front of the loop in the apron $d$ by the tightening of the chain $n'$. At the time the blade $e'$ does turn downward, as specified, the studs $o''$ on the rods $i'$ pass through grooves (shown by dotted lines in Fig. 3) in the rear sleeves $j'$ and leave the cross-bar $o'$ bearing against the rear surface of said sleeves. Thus the weights $r'$ pulling on said cross-bar $o'$ will produce no further effect on the rods $i'$. After the compressor blade $e'$ has turned downward and the weights $r'$ have been relieved from the rods $i'$, the latter must continue their forward motion following the roller $K'$ and apron $d$, and this forward movement of the rods $i'$ is effected by the contact of the edge of the compressor blade $e'$ against the forwardly moving loop of the apron $d$ inclosing the filler tobacco. The body of tobacco in the loop of the apron $d$ prevents the apron from slipping from beneath the compressor blade $e'$, and hence as the roller $K'$ is moved forward, as above described, it will, by means of the body of filler tobacco, draw the blade $e'$ and rods $i'$ with it, the weight $m'$ in the meantime being elevated and exerting a pressure on the blade $e'$ to compress the charge of filler tobacco. During the receding movement of the roller $K'$ to its rear position, it will push the rods $i'$ and its connections rearward, with the aid of the weight $m'$, until the studs $o''$ again meet the crossbar $o'$ until the latter is moved rearward far enough to elevate the weights $r'$ and permit the weight $m'$ to come to a stop and have its chain slackened to the condition shown in Fig. 24, when the compressor blade $e'$ will turn upward to its former position as explained hereinafter.

Upon the vertical front surface of the transverse cross bar $h'''$ is pivotally secured the dog $s'$, whose two positions are illustrated more clearly in Figs. 26 and 27. The dog $s'$ is connected with a spring $t'$, whose tension is exerted to retain the said dog in the vertical position shown in Fig. 27, and when in such position the said dog operates as a stop to maintain the compressor blade $e'$ in a vertical position against the loop in the apron containing the charge of tobacco, and to effectually resist any tendency of said compressor blade $e'$ under the action of its spring $k'$ to elevate from said apron $d$. The dog $s'$ remains in its vertical position shown in Figs. 25 and 27 during all the time the blade $e'$ is in contact with the rolling loop of the apron $d$, and also during the return movement of the said rods $i'$ to their rear or initial position, upon arriving at which the rearwardly extending cam arm $w'$ of said dog $s'$ will move against the vertical rod $x'$, as shown in Figs. 23 and 24, and thereby the said dog $s'$ will be drawn from its vertical position shown in Fig. 27 to an inclined position illustrated in Fig. 26, and at this time the compressor blade $e'$ will, under the force of the spring $k'$ turn upward to the position illustrated in Fig. 24. The compressor blade $e'$ is provided with the inclined slot $y'$, which, when the dog $s'$ is inclined, as shown in Fig. 26, will be in line with the same and thus the said blade will be freed from the dog and may turn upward without obstruction. After the rods $i'$ have traveled forward a definite distance sufficient to tighten the chain $n'$, the arm $w'$ will leave the rod $x'$ and the weight $m'$ will draw the blade $e'$ downward, and the dog $s'$ will lock it in position as shown in Fig. 27. Upon the return movement of the rods $i'$ the weight $m'$ will come to a rest, its force will be relieved from the compressor blade $e'$, and hence, as soon as the inclined surfaces of the arm $w'$ have moved against the side of the rod or post $x'$, the spring $k'$ may freely turn the compressor blade upward from contact with the dog $s'$.

In the foregoing description it was mentioned that the cigarette is rolled from the table $N'$ into the pocket $f'$ preparatory to its ends being trimmed, and I now refer to Figs. 1, 7 and 28 to 31 inclusive as illustrating the means presented for trimming the ends of the cigarette. Upon rods $a''$ is placed the slide $b''$, and this slide is actuated by the eccentric $c''$ and rod $d''$ from the main driving shaft. The slide $b''$ is an open frame carrying at its ends the knives $g'$ above mentioned, which co-act with the knives $e''$ on the bed $M'$ in clipping off or trimming the ends of the cigarette while the latter is held in the pocket $f'$.

Between the ends of the slide $b''$ is pivotally mounted a spring clip $f''$ which when the slide $b''$ moves inward toward the cigarette comes into contact with the same as shown in Fig. 28, in advance of the knives $g'$, which, as the slide $b''$ continues to move inward meet and sever the extreme ends of the cigarette. The normal position of the spring clip $f''$ is shown in Fig. 28, in which it will be observed that the clip is prevented from turning too far inward by a rod $g''$ and nut $h''$, the latter having a bearing against the slide $b''$ and being capable of adjustment on said rod so as to permit the clip to be changed as to its normal position with respect to the diameter of the cigarette and the pressure to be exerted in holding the same. During the inward movement of the slide $b''$, the clip $f''$ meets and holds the cigarette and yields, as shown in Fig. 29, as the slide advances farther inward to carry the knives $g'$ their full stroke; and upon the return of the slide $b''$ to its outward position the clip maintains its pressure on the cigarette until the knives fully clear the same, after which the clip $f''$, in the further outward movement of the slide $b''$, leaves the cigarette entirely and permits the same to be removed or fall into a suitably placed receptacle to receive it. The clip $f''$ thus holds the cigarette until the knives have performed their duty, and thereafter the manufacture of the finished cigarette having been completed, the clip is fully withdrawn.

The operation of the various parts of the machine has been described above in connection with the explanation of the construction of the same, and hence a further detailed description of the operation is probably unnecessary. It may be stated however, that the elongated rod of filler tobacco is formed and measured in the receiver $A$, and is thereafter delivered between the jaws $b$, $c$, which with every reciprocation across the apron $d$, deposit a severed length of the tobacco on the apron in line with the binder R' placed in position by hand and maintained by air suction and having adhesive material along one edge. With every receding movement of the jaws $b$, $c$, from across the apron $d$, the roller K' travels forward on the table N' and folds or loops the apron over the charge of filler tobacco, the rods $i'$ and compressor blade $e'$ in the meantime following the roller and said blade at the proper time turning downward in front of the tobacco and exerting its pressure against the same, under which condition the roller K' continues to travel forward, rolling the filler tobacco into the wrapper or binder and finally moving the same into the pocket $f'$ where its ends are trimmed by the knives $g'$ and the product thus completely finished ready for the market.

What I claim as my invention, and desire to secure by Letters Patent, is—

1. The reciprocating feed jaws resting upon the table, forming between themselves a space for the reception of an elongated body of filler tobacco, combined with a rolling apron, means for severing the said body of tobacco into appropriate lengths, and mechanism for successively moving the said jaws across the rolling apron, opening them to deposit the severed charge and returning them, while open, to their former position to close against the said body of filler tobacco, preparatory to moving a definite portion of the same across the rolling apron on the successive travel of said jaws across the same; substantianally as set forth.

2. The reciprocating feed jaws forming between themselves a space to receive the elongated body of filler tobacco, and having upon one end the head whose upper facing edges come into contact with each other, combined with the pivoted knives carried by said jaws and means for causing them to sever the appropriate lengths of said body of tobacco, and mechanism, substantially as described, for reciprocating said longitudinal jaws, opening the same to deposit the charge of tobacco and then returning and closing the same against the remaining portion of the filler tobacco, preparatory to drawing the same forward across the rolling apron; substantially as set forth.

3. The oscillating receiver containing the groove to form the elongated body of filler tobacco, and having separable sides, combined with means for separating said sides when the receiver is in its inverted position, the reciprocating feed jaws, beneath said receiver means for separating said jaws to receive the elongated body of tobacco from the receiver and closing said jaws against the same, and means for reciprocating said jaws to move the end of the body of tobacco across the rolling apron and return said jaws; substantially as set forth.

4. The flexible perforated rolling apron, and the perforated bed supporting said apron, combined with means connecting said bed with a suction blower and means for applying pressure to the tobacco while being rolled; substantially as set forth.

5. The flexible apron secured at one end to the bed and at the other end to a reciprocating roller, combined with means for reciprocating said roller for a portion of its line of travel without rotating it, and additional means for rotating said roller and winding said apron during the remaining portion of its line of travel; substantially as set forth.

6. The flexible rolling apron secured at one end to the rolling table and at the other end to a reciprocating roller, combined with means for reciprocating said roller to carry the apron, and means for winding said apron upon the roller during the latter portion of the forward movement of the latter, and unwinding the same during the first portion of the return movement of the said roller; substantially as set forth.

7. The flexible perforated rolling apron, and the perforated bed supporting said apron, combined with means connecting said bed with a suction blower, and means for rolling the filler tobacco in the loop of said apron, substantially as set forth.

8. The rolling apron, and the table supporting said apron and having at its front edge the pocket $f'$ to receive the rolled cigarette, combined with the open-frame-slide $b''$ in line with said pocket and mounted on horizontal rods $a''$, the knives $g'$ carried by said slide, the pivotally mounted spring clip $f''$ whose contact surface is in advance of said knives, and mechanism intermediate said slide and a driving shaft whereby during the rotation of said shaft the said slide is given a horizontal reciprocating movement on said rods; substantially as and for the purposes described.

9. In a cigarette machine a receiver having an elongated groove in which to measure the body of filler tobacco, and a pair of reciprocating feed jaws to receive between them said body of tobacco, combined with the rolling apron in the path of the end of said jaws, means for severing said body of tobacco into lengths, the compressor blade, and means for depressing the said blade into contact with the loop of the apron; substantially as set forth.

10. The pair of reciprocating feed jaws receiving between them the elongated body of filler tobacco, the rolling apron in the path of the end of said jaws, and means for reciprocating and opening and closing said jaws, combined with the compressor blade, and means for depressing said blade into contact with the loop in the said apron; substantially as set forth.

11. The flexible rolling apron forming the loop to receive the filler tobacco, combined with the pivoted compressor blade having a spring tension upward, the weight for depressing said blade into contact with the said loop inclosing the tobacco, and the pivoted dog for locking said blade in its depressed position; substantially as set forth.

12. The flexible rolling apron forming the loop to receive the filler tobacco, combined with the reciprocating frame in line with said apron, the pivoted compressor blade carried by said frame, the weight for moving said frame forward to follow the apron, and the weight connected with said blade to depress the same; substantially as set forth.

13. The rolling apron forming the loop to receive the charge of filler tobacco, combined with the reciprocating frame in line with said apron, the pivoted compressor blade carried by said frame and means adjusting the pressure of said blade against the filler tobacco; substantially as set forth.

14. The oscillating receiver having the elongated groove, the separable sides, the springs drawing said sides together, and the reciprocating cam slide to separate said sides, combined with the pair of separable reciprocating feed jaws to receive the filler tobacco from said receiver, the knives for severing the tobacco into lengths, and the rolling apron in the path of said jaws; substantially as set forth.

15. The pair of reciprocating feed jaws resting on the stationary bed and forming between them the space to receive the filler tobacco, combined with rolling mechanism in the path of said jaws, the arms for opening and closing said jaws and permitting them to move in one direction while open, the arms for reciprocating said jaws back and forth across the rolling apron, and the cutters for severing that portion of the filler tobacco carried across the apron by said jaws; substantially as set forth.

16. The pair of separable reciprocating feed jaws resting on the stationary bed and forming between them the space to receive the filler tobacco, combined with rolling mechanism in the path of said jaws, the knife bars pivoted to said jaws and having cam edges, and the rollers in the path of said cam edges; substantially as set forth.

17. The pair of separable reciprocating feed jaws resting on the stationary bed and forming between them the space to receive the filler tobacco, combined with rolling mechanism in the path of said jaws, the knife bars pivoted to said jaws and having cam edges, the rollers in the path of said cam edges, the springs drawing downward on said rollers, and the cam and arm for elevating said rollers; substantially as set forth.

18. The reciprocating roller, the rolling apron connected therewith and the sleeve within said roller and carrying the pinion and the roller having a flattened edge, combined with the reciprocating spindle or shaft entering said sleeve and carrying pinion wheels, and the guide racks both having teeth their entire length to engage the pinion wheels on the said spindle or shaft, while the inner rack has teeth at one end to engage the said pinion on said sleeve and a plain surface at the other end to engage the flattened edge of said roller on said sleeve; substantially as set forth.

19. The rolling apron forming the loop to receive the charge of filler tobacco, combined with the reciprocating pivoted compressor blade, means for turning said blade downward to engage said loop, the inclined slot in said blade, the pivoted dog to lock said blade in its vertical position and the cam arm and post to turn said dog in line with said slot and free said blade; substantially as set forth.

Signed at New York, in the county of New York and State of New York, this 19th day of December, A. D. 1892.

JOHN R. WILLIAMS.

Witnesses:
CHAS. C. GILL,
ED. D. MELLER.